May 3, 1927.

W. W. DAVIDSON 1,627,015

MACHINE FOR SEPARATING AND FEEDING BLANKS

Filed Nov. 21, 1922    12 Sheets-Sheet 1

Witness
Martin H. Olsen.

Inventor
William Ward Davidson
By Geo. E. Waldo
Atty.

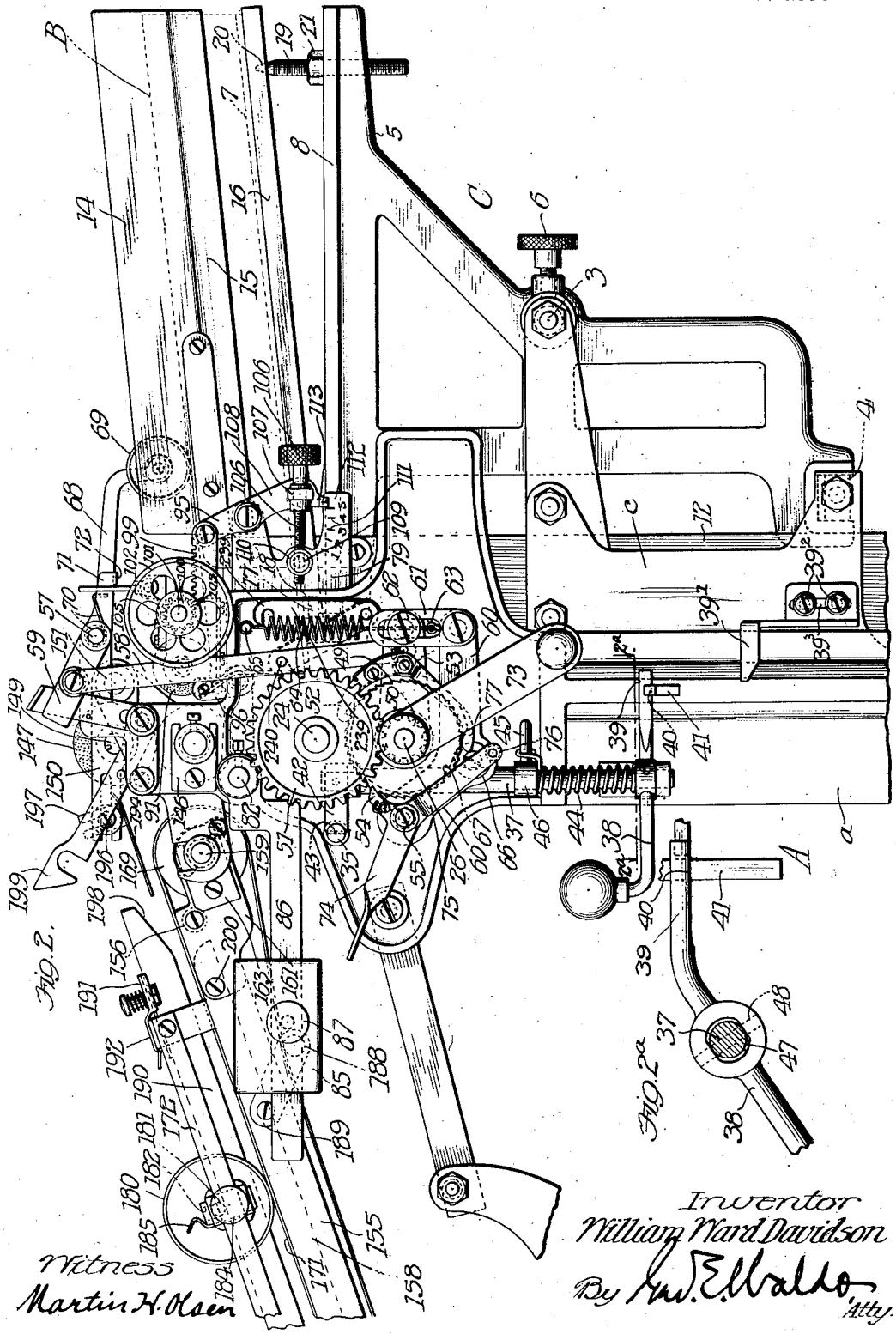

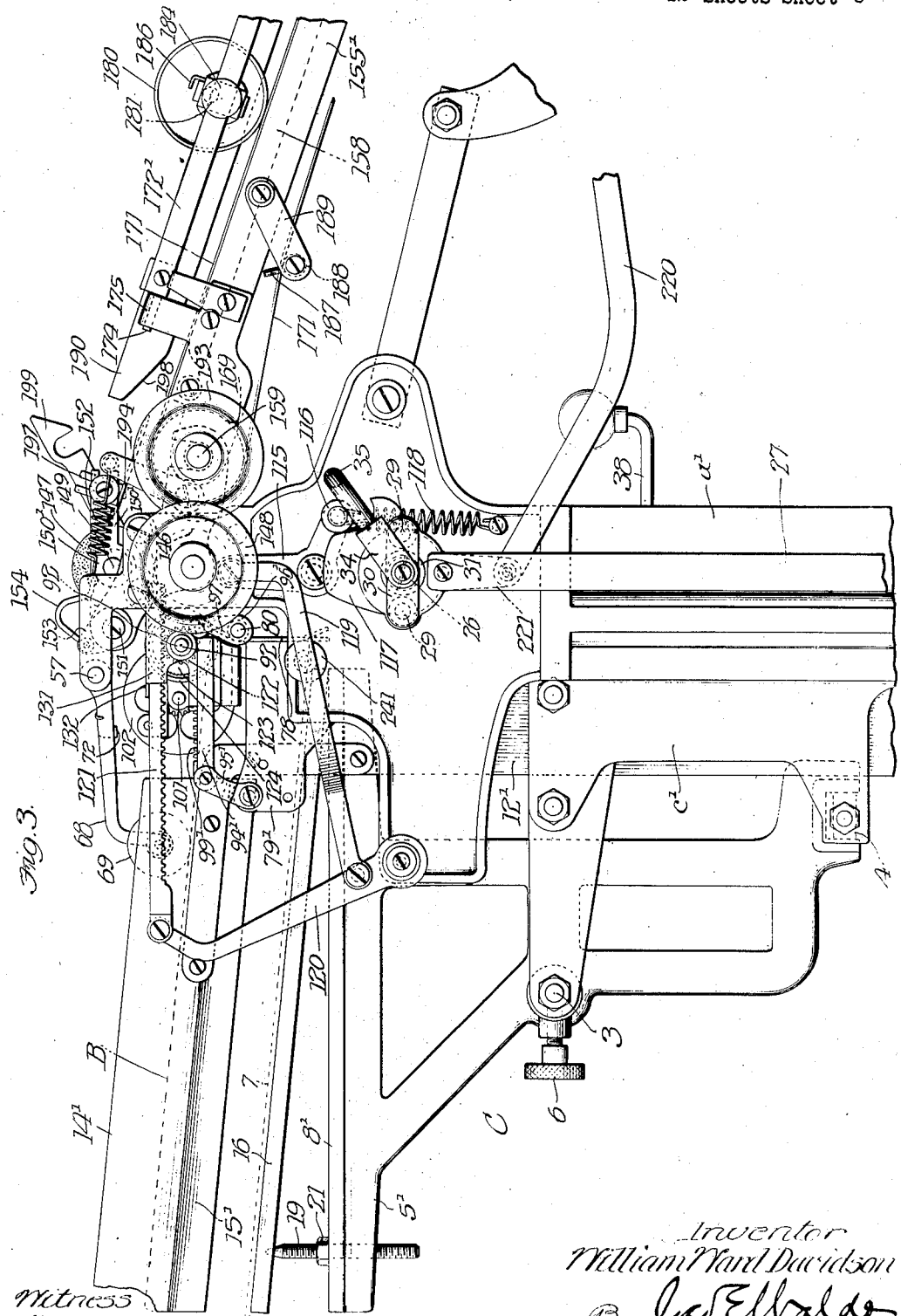

May 3, 1927.
W. W. DAVIDSON
1,627,015
MACHINE FOR SEPARATING AND FEEDING BLANKS
Filed Nov. 21, 1922     12 Sheets-Sheet 4
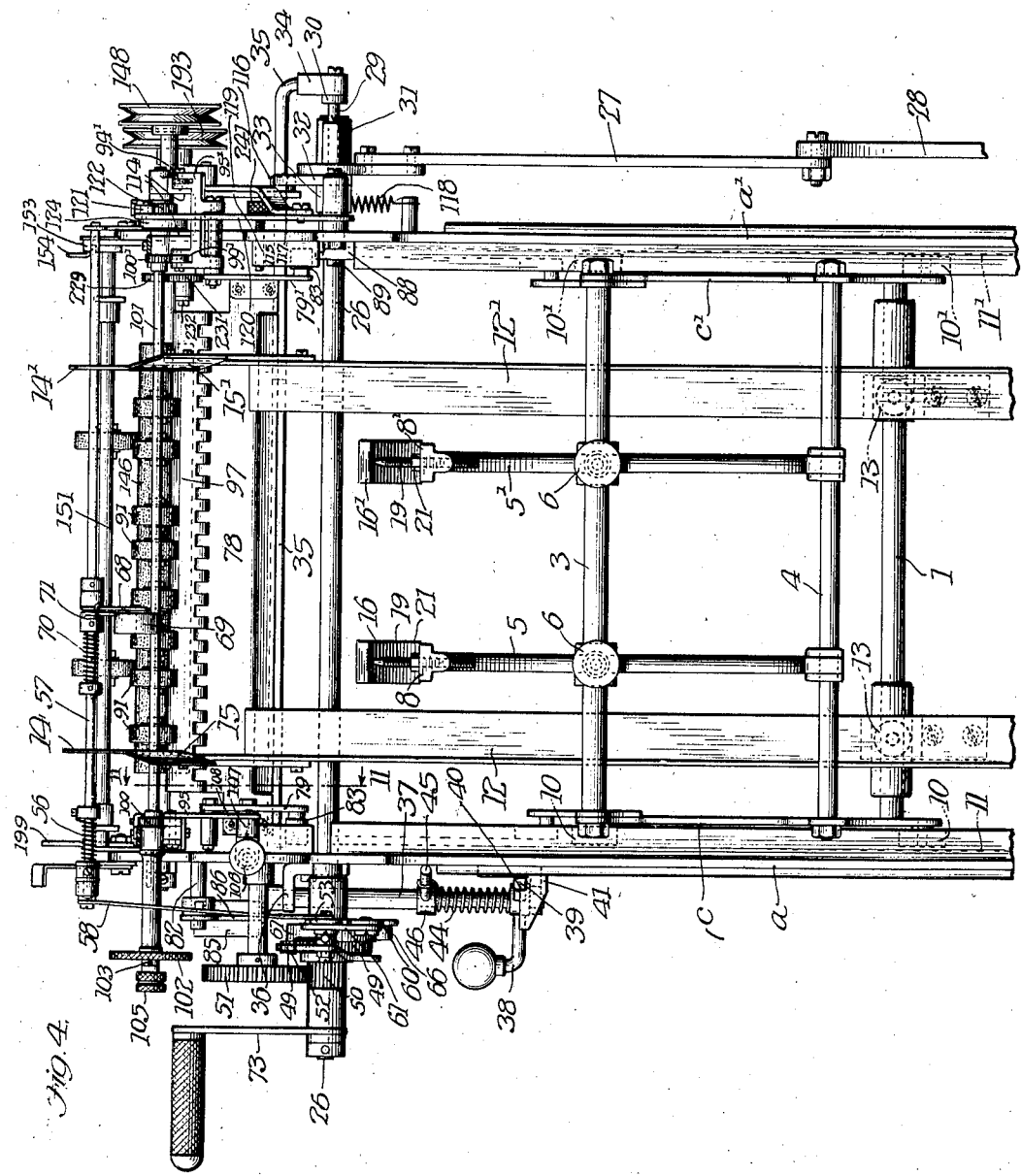

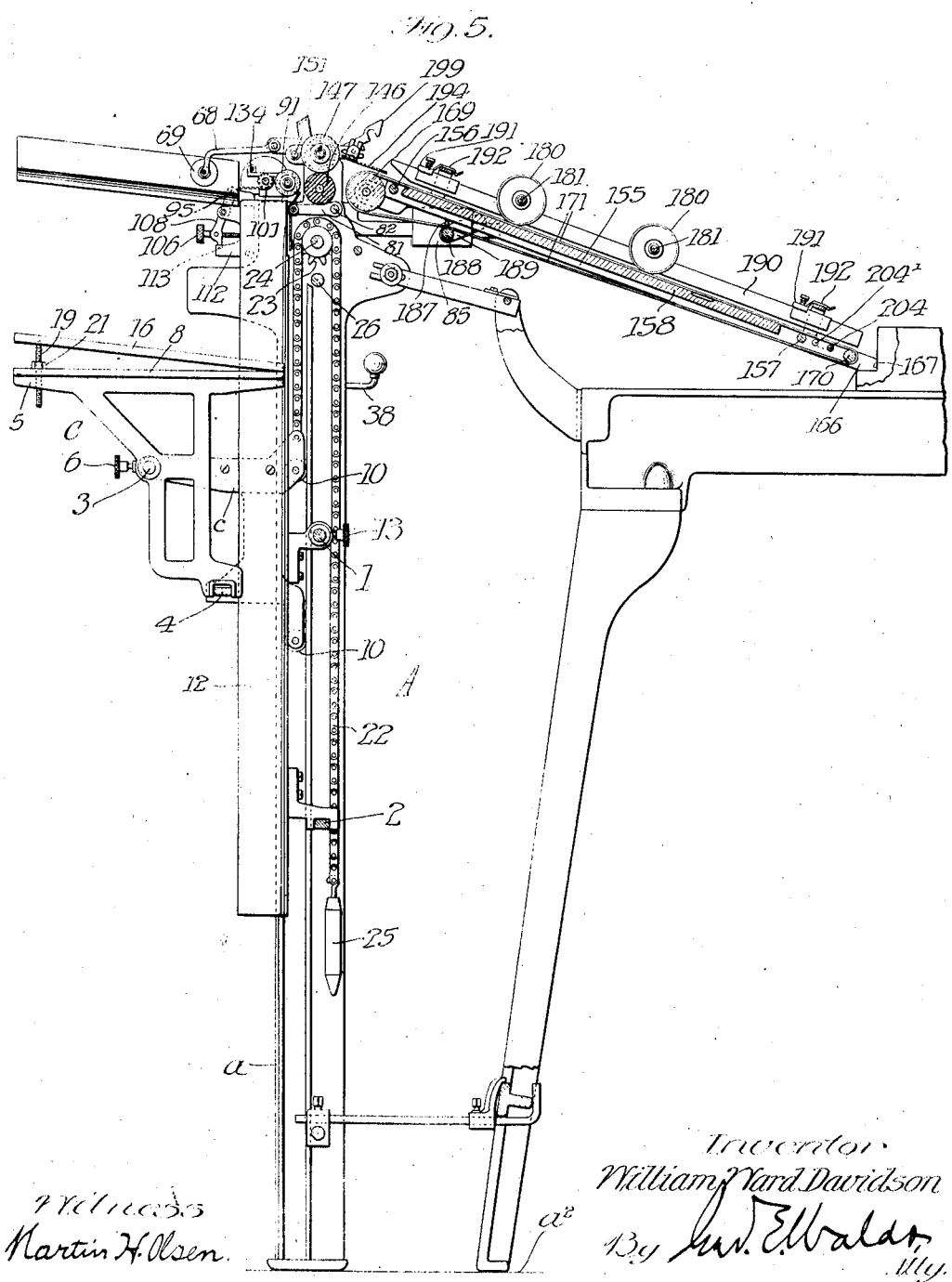

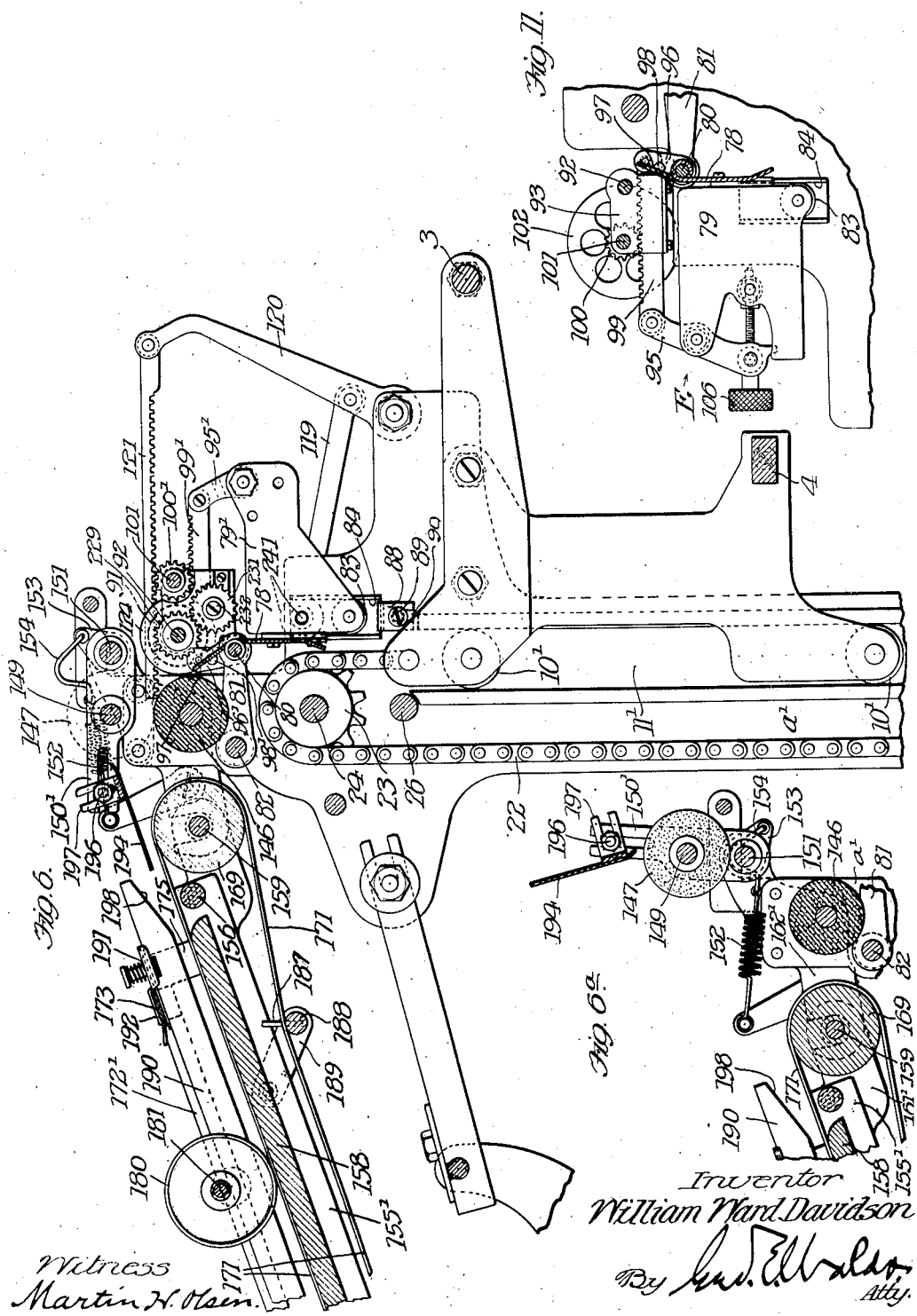

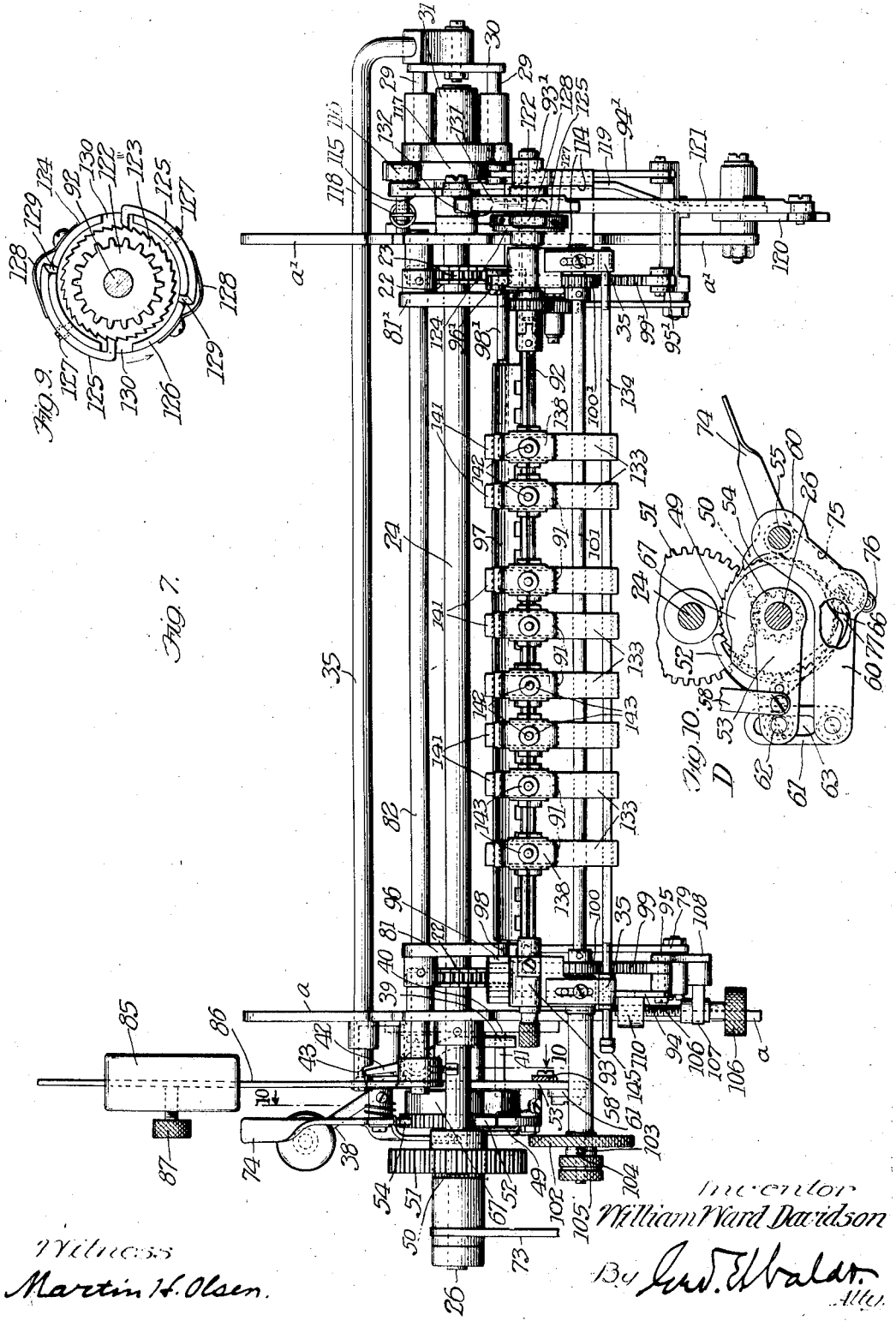

May 3, 1927.
W. W. DAVIDSON
1,627,015
MACHINE FOR SEPARATING AND FEEDING BLANKS
Filed Nov. 21, 1922    12 Sheets-Sheet 8
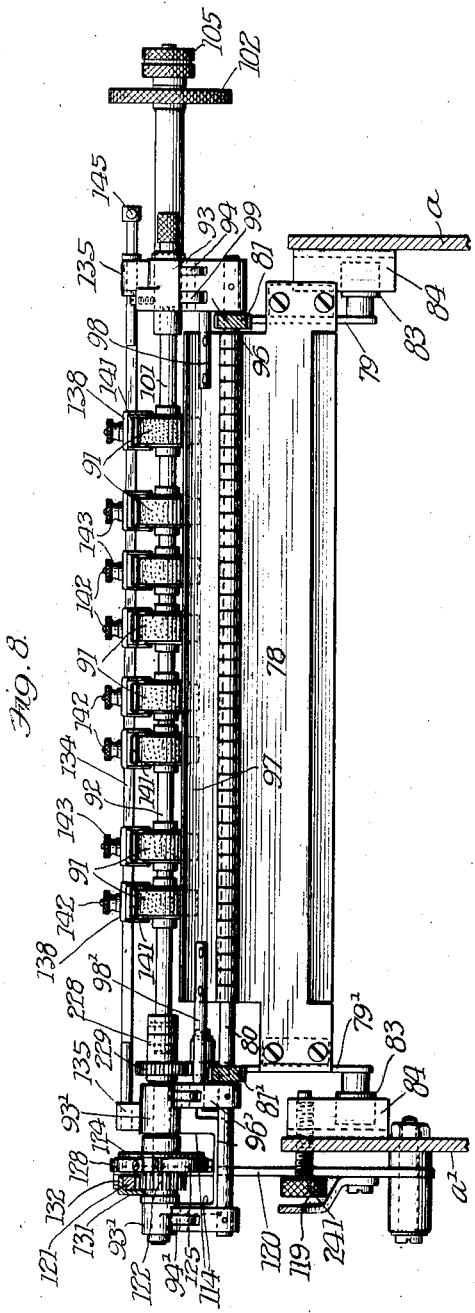
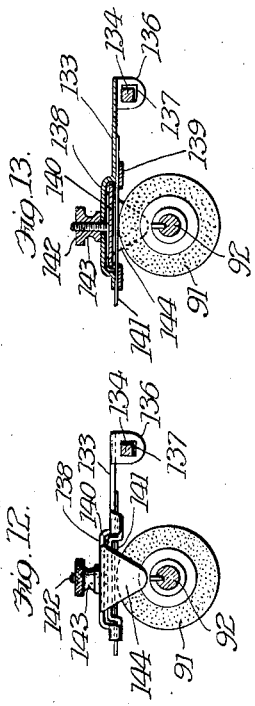
Witness
Martin H. Olsen.
Inventor
William Ward Davidson.
By Geo. E. Waldo
Atty.

May 3, 1927.
W. W. DAVIDSON
MACHINE FOR SEPARATING AND FEEDING BLANKS
Filed Nov. 21, 1922     12 Sheets-Sheet 9
1,627,015
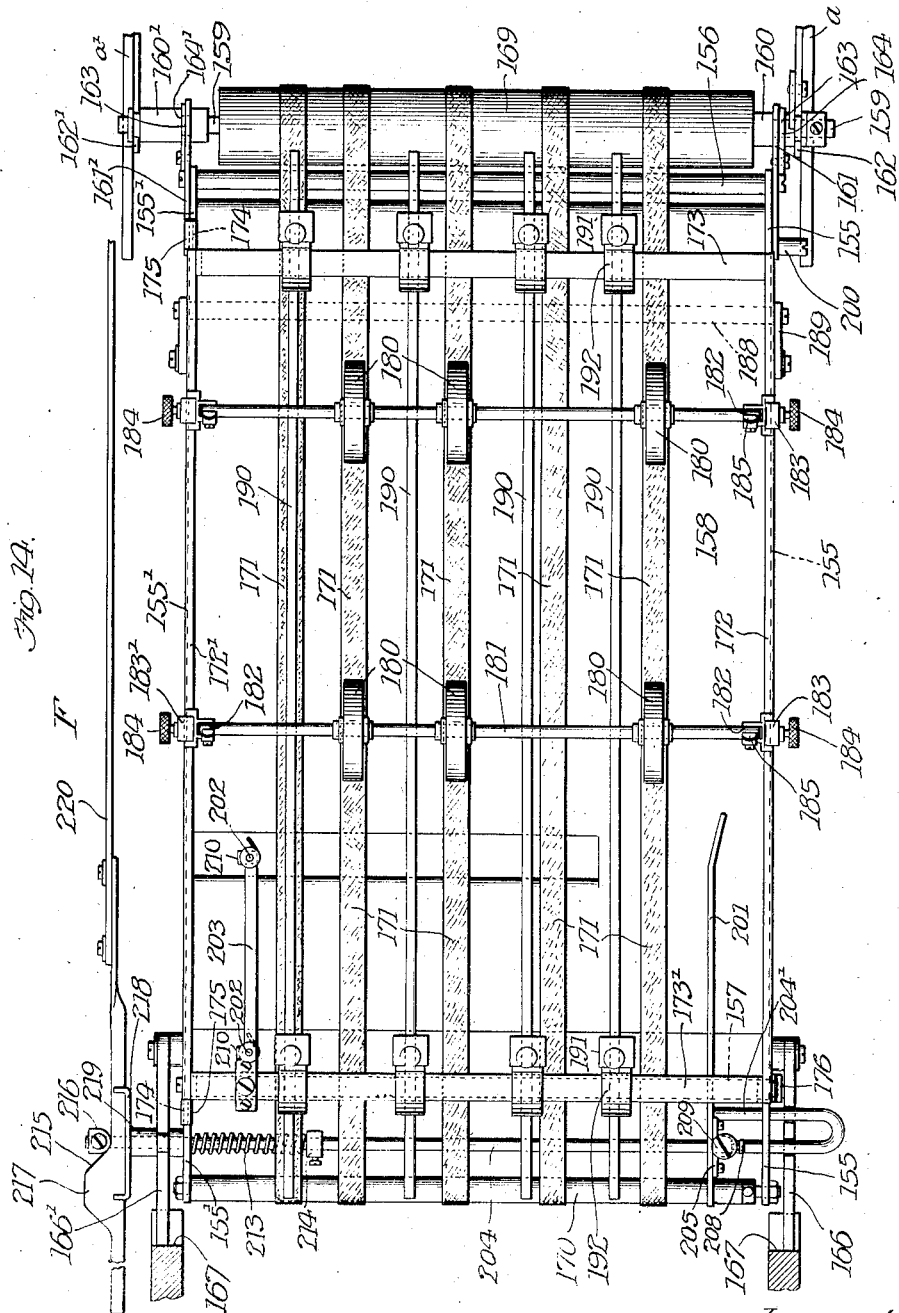
Witness
Martin K. Olsen
Inventor
William Ward Davidson
By Geo. E. Waldo
Atty

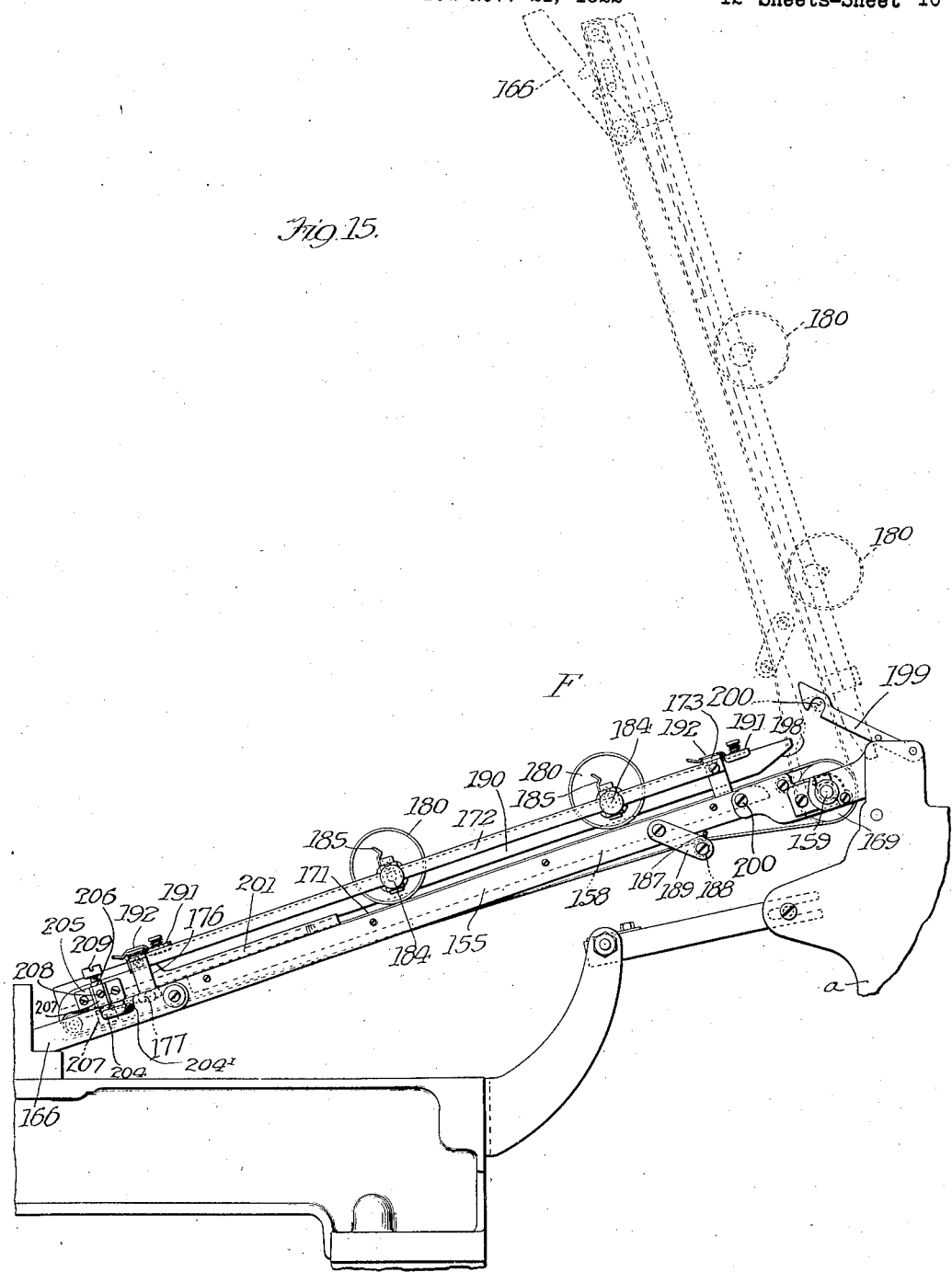

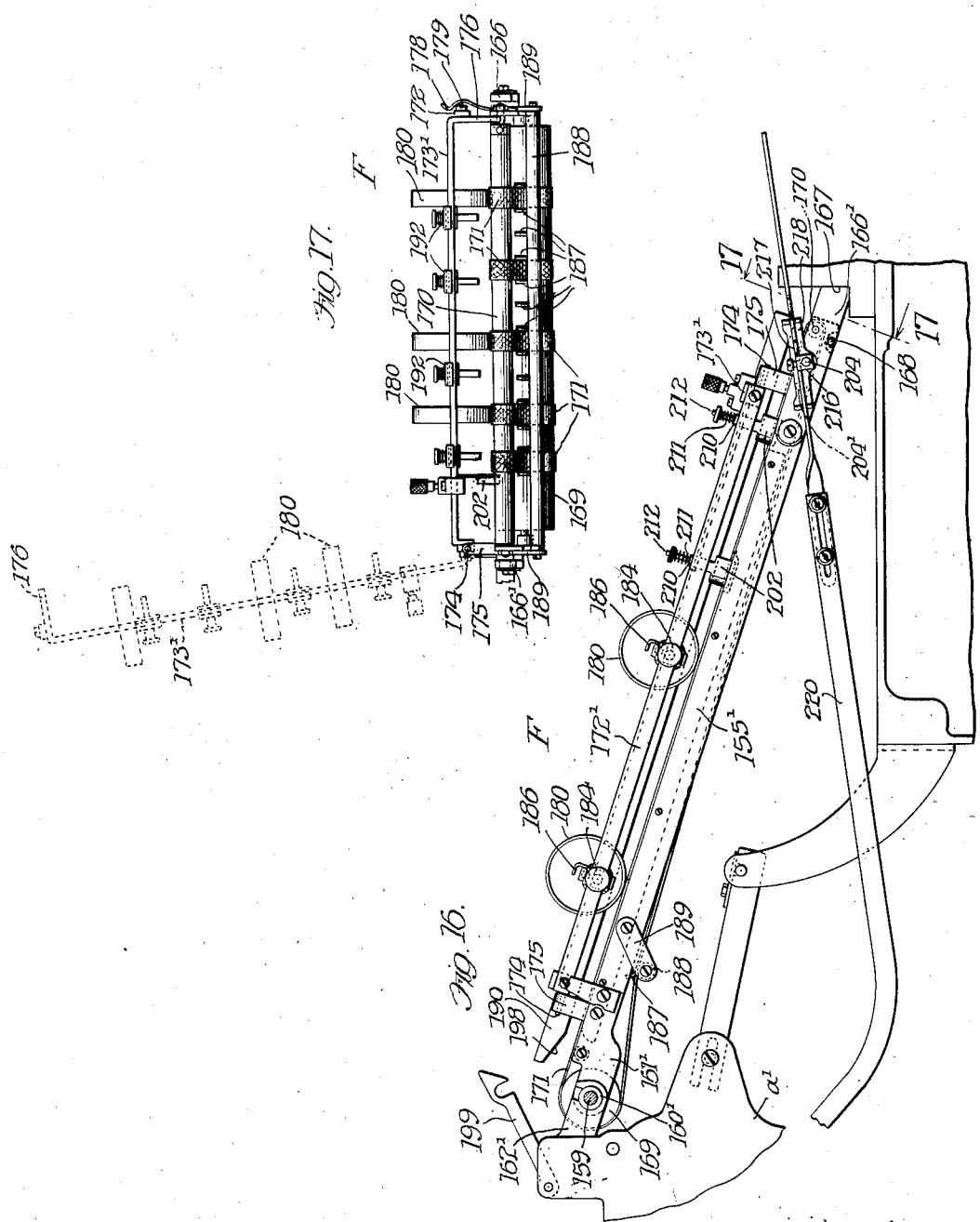

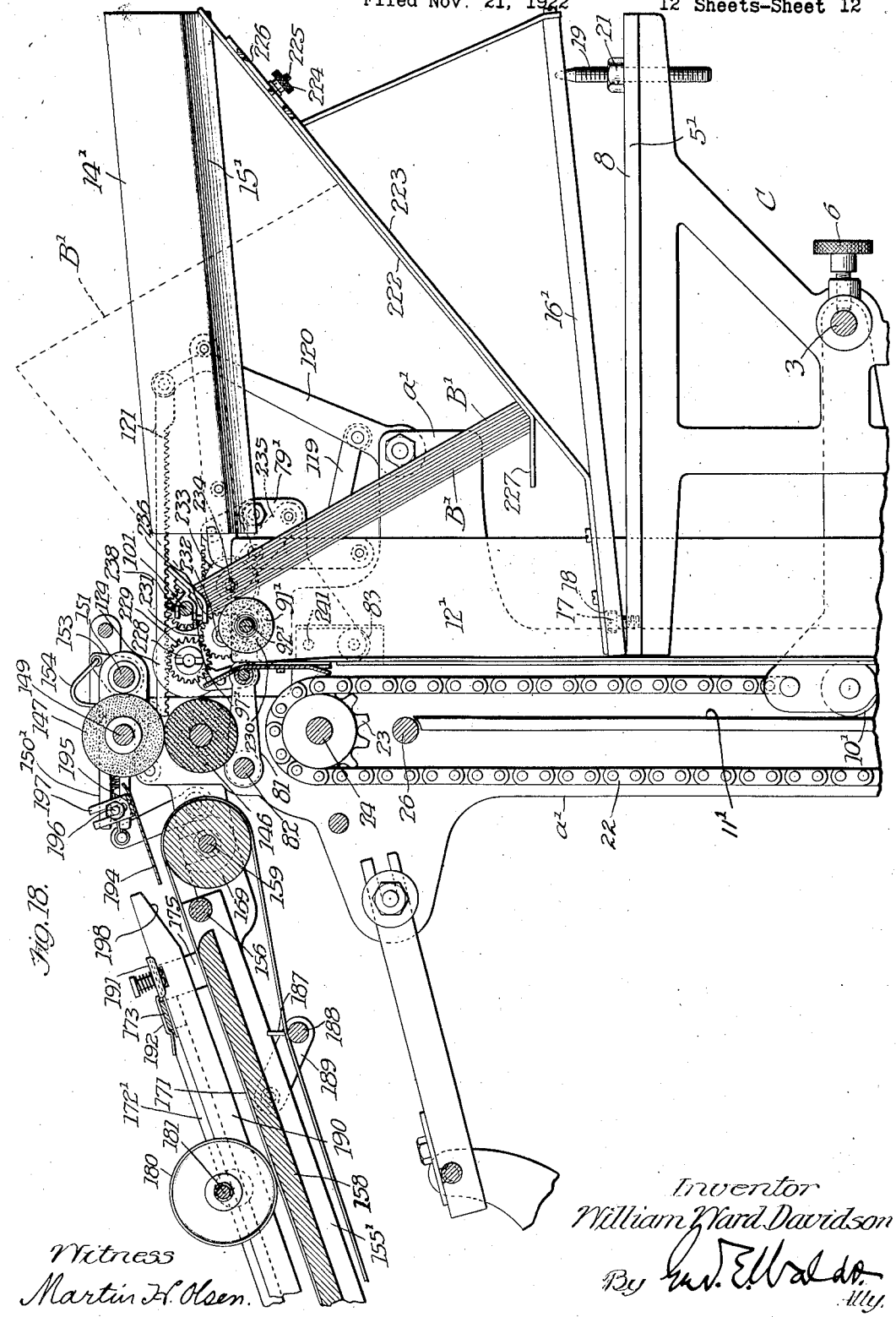

Patented May 3, 1927.

1,627,015

UNITED STATES PATENT OFFICE.

WILLIAM WARD DAVIDSON, OF EVANSTON, ILLINOIS, ASSIGNOR TO DAVIDSON MANUFACTURING COMPANY, OF MADISON, WISCONSIN, A CORPORATION OF WISCONSIN.

MACHINE FOR SEPARATING AND FEEDING BLANKS.

Application filed November 21, 1922. Serial No. 602,359.

This invention relates to machines for separating and feeding blanks, as sheets of paper, envelopes, cards, pamphlets and the like.

The name "blanks" will be used throughout the specification and claims to designate all of the different articles which the machine is adapted to handle.

Among the objects of the invention are: to provide a machine adapted for receiving a relatively very large quantity of blanks whereby it will be necessary to refill the machine with blanks only at relatively long intervals; to provide a machine in which the blanks, as they are drawn from the pack, will be subjected to no resistance due to the weight of the pack or the means for supporting the same; to provide a machine which may be quickly and accurately adjusted for separating and feeding different kinds of blanks and also different kinds of stock, that is stock of varying thickness, stiffness and degrees of finish; and to provide a machine in which the traction of the separator roll with the blanks, as they are withdrawn from the pack, may be adjusted to correspond to the resistance offered to the withdrawal of the single blanks from the pack.

To effect the various objects of the invention, my improved machine comprises a carriage mounted on the machine frame so as to be movable vertically, on which the blanks are adapted to be supported in flatwise position, a separator roll adapted to contact directly with the top blank of the pack, an adjustable counterweight applied to said separator roll, whereby the traction of said separator roll with the blanks may be adjusted to correspond to the resistance offered to the withdrawal of said blanks, a separator plate in association with said separator roll, means for varying the relative positions of said separator roll and plate, means for varying the inclination of the separator plate, preferably without varying the distance between the edge of said plate and the separator roll, means for raising and lowering the pack carriage, comprising power means for raising the same, and means for imparting step by step rotation to the separator roll.

My improved machine also comprises the various other features, combination of features and details of construction hereinafter described and claimed.

In the accompanying drawings, in which my invention is fully illustrated,

Figures 2 and 3 are, respectively, enlarged right and left hand side views thereof.

Figure 1:
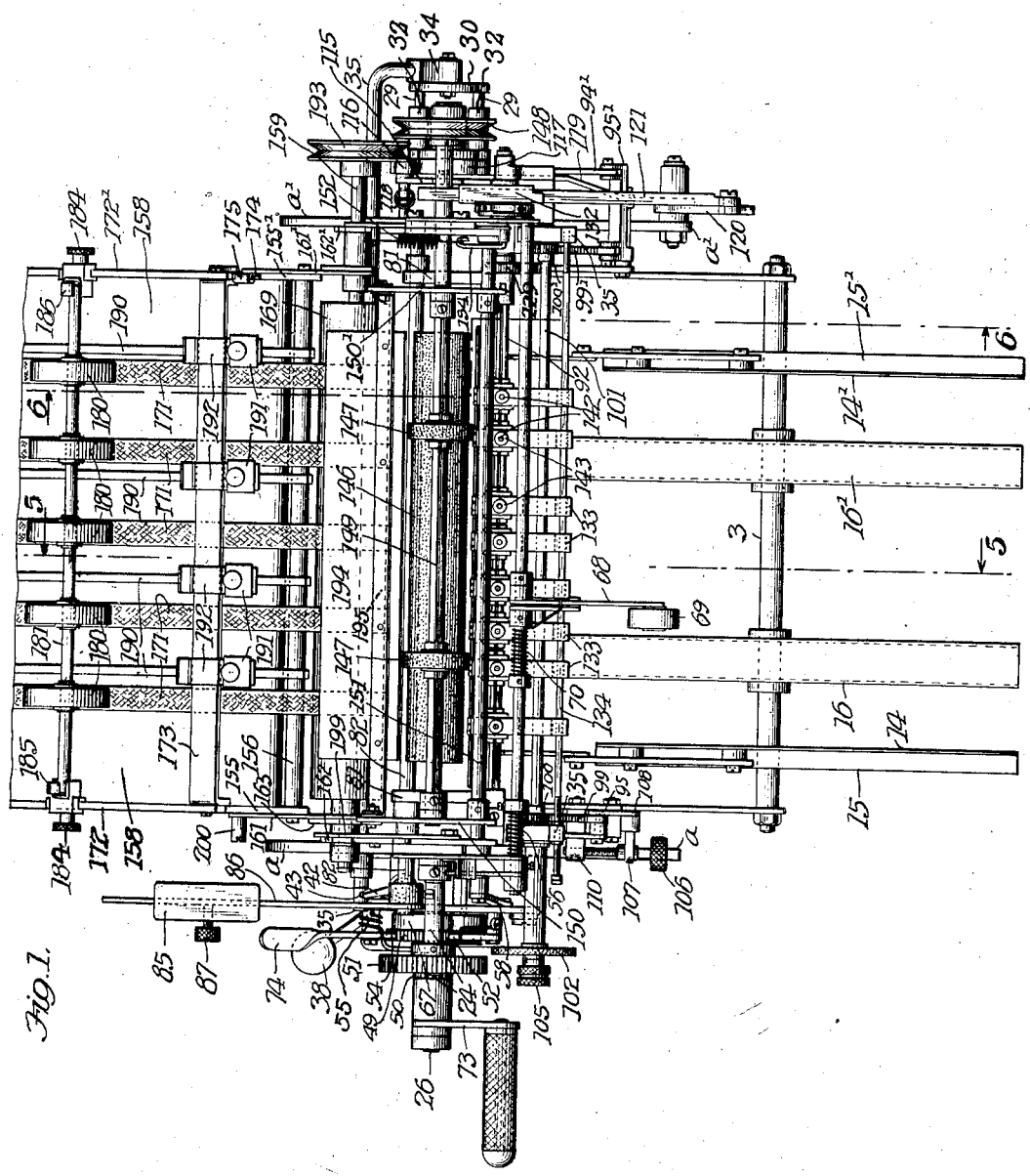
Figure 1 is a top plan view of a separating and feeding machine of my invention.

Figure 2$^a$ is a fragmentary, detail sectional view on the line 2$^a$—2$^a$ of Fig. 2.

Figure 4 is a rear view thereof.

Figures 5 and 6 are, respectively, sectional elevations on the lines 5—5 and 6—6 of Fig. 1.

Figure 6$^a$ is a fragmentary view on the line 6—6 of Fig. 1, showing the guide plate for the blanks in raised position.

Figure 7 is an enlarged top plan view, parts of the machine being omitted to disclose underlying parts.

Figure 8 is an enlarged front view particularly designed to show the separator mechanism, other parts of the machine being, for the most part, omitted.

Figure 9 is a detached side view of the ratchet gear for operating the shaft of the separator roll.

Figure 10 is a detached sectional side view of the ratchet gear forming part of the mechanism for raising and lowering the pack carriage on the line 10—10 of Fig. 7.

Figure 11 is a fragmentary sectional elevation on the line 11—11 of Fig. 4, showing the means for supporting and adjusting the blank separator devices.

Figures 12 and 13 are detached views showing in side elevation and longitudinal section, respectively, devices applied to the separator roll for cleaning and roughening the same.

Figure 14 is a top plan view of the conveyor board.

Figure 15 is a right hand elevation of said conveyor board shown as applied in use in full lines, and in raised position, to render underlying parts accessible, in dotted line.

Figure 16 is a left hand side elevation of the conveyor board shown as applied in use.

Figure 17 is an end view of the conveyor board from the position 17—17 of Fig. 16, showing the top section thereof in raised position, in dotted lines; and Figure 18 is a sectional elevation corresponding substantially to Fig. 6, illustrating an adaptation of my improved machine for feeding envelopes.

The frame of my improved machine designated as a whole A, comprises substantially similar right and left hand frame members $a$, $a^1$, which are rigidly connected in spaced relation by transverse rods or bars 1 and 2, said frame members being shaped to form supporting legs or standards adapted to rest on the floor or other support, the line of which is indicated at $a^2$.

The pack of blanks, designated B, is supported upon a carriage C comprising side frame members $c$, $c^1$, rigidly connected by transverse bars 3 and 4, and brackets 5, $5^1$, supported on said bars so as to be adjustable towards and from each other and adapted to be secured in adjusted positions by set screws 6 threaded through bosses on said brackets, in line with the transverse bar 3 of the carriage. The pack B rests directly upon a board 7 supported on arms 8 of the brackets 5, $5^1$, the plane of the top sides of said bracket arms and the plate 7 being substantially horizontal, whereby the pack of blanks B will be supported flatwise in substantially horizontal position. The width of the board 7 is approximately equal to the width of the blanks which are to be fed and to adapt the machine for feeding blanks of different widths, boards of different widths will be provided, said boards being preferably unattached so that they may be changed quickly when desired.

The pack carriage C is bodily movable vertically, being confined and guided in its vertical movement by engagement of rigid parts thereof with guide bearings on the machine frame. In the preferable construction shown, vertically spaced roller-studs 10, $10^1$, project from opposite sides of the carriage C and are fitted to run in guide grooves 11, $11^1$, formed in the adjacent sides of the frame members $a$, $a^1$.

The pack of blanks B is supported and confined upon the pack carriage C and the position of the blanks relative to the separator mechanism, presently described, is defined by side guides consisting, as shown, of angle bars 12, $12^1$, supported in upright parallel positions on the transverse frame bars 1 and 2 so as to be separately adjustable transversely of the machine and adapted to be secured in adjusted positions by set screws 13 threaded through said guide bars and adapted to impinge upon the frame bar 1. Formed on or secured to the upper ends of the guide bars 12, $12^1$, are rearwardly extending plates 14, $14^1$, the inner sides or faces of which are substantially parallel with each other and are positioned in the planes of the inner sides of surfaces of the lateral flanges of the guide bars 12, $12^1$ to which they are secured, respectively. The lateral flanges of the guide bars 12, $12^1$ are adapted to embrace the lateral sides of the pack of blanks B, and to support and guide said blanks as the carriage is raised in the operation of the machine, while the rearwardly extending plates 14, $14^1$ embrace the lateral sides of the blanks adjacent to the top of the pack, when in position for feeding, and to prevent the blanks from catching on the lower edges of the rearwardly extending plates 14, $14^1$, their lower edges are outwardly and downwardly flared, as shown at 15, $15^1$, the flared lower edges of said plates also operated to guide the blanks at the top of the pack C into proper position between the parallel sides or faces of said rearward extensions 14, $14^1$, as the pack carriage is raised.

If found necessary or desirable, means are also provided for tilting the blanks of the pack B at a slight angle frontwards and downwards, thus insuring that the front edges of the blanks will rest in contact with the front flanges of the guide bars 12, $12^1$, said means consisting, as shown, of bars 16, $16^1$, the front ends of which rest upon the front ends of the upper surfaces of the brackets 5, $5^1$, being confined in position thereon by headed studs 17 which are threaded into the brackets 5, $5^1$, and are loosely fitted to holes 18 formed in said bars 16, $16^1$. At their rear ends, said bars are supported by means of screws 19 threaded through the outer ends of the brackets 5, $5^1$, upon the upper ends of which the bars are adapted to rest. As shown, displacement of the bars 16, $16^1$ is prevented by engagement of the upper ends of said screws 19 with holes formed in the under side of said bars, as shown at 20, the upper ends of said screws and the holes which receive the same, being preferably correspondingly tapered. The supporting screws 19 are adapted to be secured in different adjusted positions by means of lock nuts 21, in a familiar manner. With the described construction, it is obvious that the inclination of the blanks of the pack B may be varied as desired, within limits or, by removing the screws 19 and permitting the bars 16, $16^1$ to rest flat upon the brackets 5, $5^1$—the blanks will be supported flatwise in horizontal position.

The pack carriage C is supported by means of chain belts 22 connected thereto and which pass over sprocket wheels 23 secured to a shaft 24 rotatably mounted in suitable bearings in the frame members $a$, $a^1$. The ends of said chain belts opposite to the ends thereof attached to the pack carriage, hang free, weights 25 being preferably suspended therefrom, adapted to prevent jumping of said chain belts calculated to cause disengagement thereof from the teeth of the sprocket wheels 23.

The pack carriage C is adapted to be raised both by power and manually, but can be lowered manually only.

As shown, the power operating means for raising said pack carriage is as follows: Rotatably mounted in bearings in the side frame members is a shaft 26 to which oscillating movement is adapted to be imparted by means of a lever arm 27 secured to said shaft, said lever arm being connected by a rod 28 with a driven part of the machine in connection with which my improved separating and feeding machine is being used. Also, to provide for throwing the machine out of operation without stopping the machine to which it is applied, said lever arm 27 is loosely mounted on the rock shaft 26 and is adapted to be secured thereto and disconnected therefrom by means of a suitable clutch, which may conveniently be manipulated by the operator to throw the separator mechanism into and out of operation. As shown, said clutch consists of pins 29 rigidly secured to a bar 30, said pins being slidably fitted to holes formed in a head 31 on the upper end of the arm 27, and being adapted to engage corresponding holes formed in lugs 32 on a head 33 secured to the rock shaft 26.

As shown, the means for operating said clutch are as follows: The bar 30 in which the pins 29 are secured is pivoted to a block 34 secured to a rod 35 which is movable endwise in bearings formed in the side frame members $a$, $a^1$, the relation being such that endwise movement of said rod in opposite directions will impart bodily movement to the block 34 to effect engagement and disengagement of the clutch pins 29 with and from the holes in the lugs 32 on the head 33 secured to the shaft 26.

Endwise movement is adapted to be imparted to the rod 35 to throw out said clutch by a spring applied thereto and said rod is adapted to be moved endwise against the force of said spring by a lever arm secured thereto. As shown, the means for operating said clutch are as follows:—The end of the clutch operating rod 35 projects through and beyond the side frame member $a$ and mounted to turn in bearings formed in brackets 36 secured to the frame member $a$ is a rod 37 secured to which is a lever arm 38, a rearward extension 39 of which is adapted to engage a notch 40 in a lug 41 secured to and which projects laterally from said frame member $a$, engagement of said extension with said notch operating to secure the lever arm 38 in position to effect engagement of said clutch. Pinned or otherwise rigidly secured to the upper end of the rod 37 is an arm 42, the end of which engages a notch 43 formed in the adjacent side of the clutch operating rod 35. Surrounding the rod 37 is a coiled spring 44 the opposite ends of which are anchored to the lever arm 38 and to a pin 45 secured in a collar 46 fitted to turn on the rod 37, the pin 45 being of such length that, by contact with the side of the frame member $a$, turning of said pin and collar by the spring 44 will be prevented. As previously stated, the spring 44 is applied to the rod 37 in such manner that movement of the clutch operating rod 35 under the influence of said spring will disengage the clutch pins 29 from the holes in the lugs 32, while the lever arm 38 provides means for turning the rod 37 against the force of said spring to impart endwise movement to said clutch operating rod to effect engagement of the clutch, in which position it is adapted to be locked by engagement of the extension 39 of said lever arm with the notch 40 in the bracket 41. Also, to provide for pivotal movement of the lever arm 38 to effect engagement and disengagement of the extension 39 of said arm with and from the notch 40, the means for securing said lever arm to said rod 37 consists of a slot 47 formed in said lever arm and a pivot pin 48 secured in said lever arm which extends across the slot therein and engages a hole formed in the rod 37. With the described construction it is obvious that the spring 44 will tend to impart pivotal movement to the lever arm 38 to effect engagement of the extension 39 thereof with the notch 40, while at the same time, permitting pivotal movement of said lever arm on the pivot pin to effect engagement and disengagement of said lever arm extension 39 with and from the notch 40.

In addition to the means for operating said clutch manually, my improved machine preferably comprises automatic means for throwing out said clutch when the pack-carriage C attains a predetermined position, as it is fed upwards.

As shown, the means for this purpose comprises a lug or projection $39^1$, on said pack-carriage which projects beneath the rearward extension 39 of the clutch operating lever 38, when in engagement with the notch 40 formed in the lug 41, the relation being such that, as the pack-carriage approaches the limit of its upward movement, the lug $39^1$ will engage the rearward extension 39 of the clutch operating lever 38 and will disengage it from the notch 40—thus permitting the spring 44 to disengage the clutch—at the same time that said pack-carriage reaches the designed limit of its movement. Also, to provide for varying disengagement of the clutch relative to the movement of the pack-carriage, the lug $39^1$ forms a separate part and is secured to the pack-carriage so as to be vertically adjustable thereon. To this end said lug is secured to said pack-carriage by clamping screws $39^2$ secured in the frame member $c$ of the pack-carriage and which extend through a slot $39^3$ formed in said lug, said slot being longer than the distance between the remote sides of said clamping screws.

As shown, also, the power driving connections for the shaft 24 comprise a ratchet gear, designated as a whole D, so constructed and arranged that oscillation of the shaft 26 will impart step by step rotation to the shaft 24 in a direction to raise the pack carriage C. As shown, said ratchet gearing comprises a ratchet wheel 49 mounted to turn on the shaft 26, secured to rotate with which is a pinion 50 which meshes with a gear 51 secured to the shaft 24. Step by step rotation is adapted to be imparted to the ratchet wheel 49 by an actuating pawl 52 pivoted to an arm 53 mounted to turn on the shaft 26, which is adapted to engage the teeth of the ratchet wheel 49, and backing up of the ratchet wheel, when the actuating pawl 52 is retracted, is prevented by a retaining pawl 54 pivoted to a stud or boss 55 on the frame member a.

Retraction of the actuating pawl 52 is adapted to be effected by means of a spring 56, or equivalent yielding means, applied to a rod 57 mounted to turn in bearings in the side frame members a, a¹, said rod being connected with the pawl arm 53 by means of a link 58 pivoted to said pawl arm and to an arm 59 secured to the rod 57, and said actuating pawl is adapted to be advanced to rotate the ratchet wheel 49, by means of a lever 60 pivoted to the stud 55 and which extends downwardly and rearwardly beneath the shaft 26 directly below the pawl arm 53, the rear end of said lever 60 being connected to the rear end of the pawl arm 53 by means of a link 61 pivoted to said lever arm and connected to the pawl arm 53 by a stud 62 secured in said pawl arm and which extends through a slot 63 in the link 61. The lever 60 is adapted to be maintained yieldingly at the upward limit of its movement by means of a spring 64 which connects said lever with a pin 65 secured in the frame member a, and said lever 60 is adapted to be depressed against the force of the spring 64 at each oscillation of the rock shaft 26 by means of a roller stud 66 secured to said lever 60 between its ends, said roller stud running in contact with a cam 67 secured to the rock shaft 26.

In the operation of the machine, the actuating pawl 52 is adapted to be maintained inactive, at intervals, by means controlled by variations in the level of the top of the pack of blanks B, the relation being such that when the level of the top of the pack attains a predetermined height, said actuating pawl will be maintained inoperative, but will again become operative when the top of the pack falls below said predetermined level. As shown, the means for thus controlling the operation of said actuating pawl 52 consists of an arm 68 secured to the rod 57, mounted at the outer end of which is a roller 69 which is adapted to bear against the topmost blank of the pack B when the level of the top of the pack is at or adjacent to its extreme upper limit, the relation being such that when the level of the top of the pack B attains a predetermined height, turning movement of the rod 57 by the spring 56 will be limited by contact of the roller 69 with the top of the pack B, to limit retraction of the actuating pawl 52 to a distance less than the pitch of the teeth of the ratchet wheel 49, thus rendering said actuating pawl inoperative and preventing the pack-carriage C from being raised thereby. As the level of the top of the pack B falls—that is as blanks are withdrawn—the turning movement of the rod 57 will gradually increase until, when the level of the top of the pack falls below said predetermined level, the retraction of the actuating pawl 52 will be sufficient to render it operative—that is to cause it to engage the next rearward tooth of the ratchet wheel 49—thus, through the gearing associated therewith, turning the sprocket wheel shaft 24 and raising the pack carriage C to again bring the top of the pack B above its predetermined upper limit. This cycle is repeated indefinitely throughout the operation of the machine.

To prevent bending or distortion of the arm 68 by raising the pack-carriage C so that the level of the top of the pack B will be appreciably higher than the contemplated extreme upper operating limit thereof—due to inexperience or carelessness on the part of the operator and which would throw the machine out of normal adjustment—the said arm 68 is preferably connected to the rod 57 so as to turn thereon and is maintained yieldingly in operative position by means of a spring applied thereto adapted to hold said arm yieldingly in contact with a rigid stop on said rod 57. As shown, the spring applied to said arm 68, designated 70, consists of a coiled spring which surrounds the rod 57, one end of which is secured to said rod and the other to the arm 68, and the stop on said rod 57 consists of an arm 71 rigidly secured to the rod 57 adjacent to the arm 68, formed on which is a lug 72 which projects laterally from said arm 71 beneath the arm 68 and supports said arm 68 from being turned by the spring 70. The spring 70 is of such strength and is applied to the arm 68 in such relation that it will overcome the tension of the spring 56, so that contact of the roller 69 with the top of the pack B, when it attains or exceeds its predetermined limit, will arrest turning movement of the shaft 57 by the spring 56 before the actuating pawl 52 is retracted a sufficient distance to engage the next rearward tooth of the ratchet wheel 49.

With the exercise of very little care by the operator, any danger of stressing and bending the arm 68 can be avoided, and my invention therefore contemplates equally securing the arm 68 rigidly to the rod 57.

With the described construction it is obvious that the ratchet gear D will be actuated to raise the pack carriage C and pack B only when the level of the top of the pack falls below its predetermined limit.

The pack carriage C is adapted to be raised manually by means of a crank 73 secured to the pinion 50 and ratchet wheel 49, rotation of said pinion by said crank in a direction to cause the teeth of the ratchet wheel 49 to overrun the pawls 52 and 54 operating to turn the gear 51 and the sprocket wheel shaft 24 in a direction to raise the pack carriage C.

To lower the pack carriage C, it is first necessary to disengage both the actuating pawl 52 and the retaining pawl 54 from the teeth of the ratchet wheel 49 to permit the sprocket wheel shaft 24 to be turned backwards and, to prevent the pack carriage from falling from its own weight or the added weight of a pack of blanks B carried thereby, the means for disengaging said pawls is preferably so constructed and arranged that it may be operated with one hand only, leaving the other hand free to lower said pack carriage gradually by grasping the handle of the crank 73.

In the preferable construction shown, both of said pawls are spring actuated pawls, and the means for disengaging them consists of a lever arm 74 applied directly to the retaining pawl 54, adapted to turn said pawl pivotally to disengage it from the ratchet wheel 49, and the means for disengaging the pawl 52 comprising an arm 75 forming an extension of the lever arm 74, a roller stud 76 on which is adapted to engage an extension 77 of the actuating pawl 52 beyond its pivotal point, the relation being such that when the lever arm 74 is turned pivotally to disengage the retaining pawl 54, the roller stud 76 on the extension 75 of said lever arm will engage the extension 77 of the actuating pawl 52 and will turn same pivotally to disengage said actuating pawl from the teeth of the ratchet wheel 49 in the manner desired.

Considered without reference to detail, the separator mechanism of my improved machine is of the general type comprising, in combination, a separator roll and a separator plate, the separator roll in operation, resting upon the top blank of the pack of blanks B on the pack-carriage C, and the free edge of the separator plate extending a sufficient distance above the plane of the top of the pack B—which is substantially coincident with a horizontal plane tangent to the under side of the separator roll—so that the advancing edge of the top blank will engage said separator plate adjacent to its free upper edge, and the traction of the separator roll will operate to force said top blank over the top edge of said plate to devices adapted for delivering the blanks to mechanisms in connection with which they are to be used. However, as my invention relates to the separator mechanism it embodies several novel features of great value and importance, which, so far as I have any knowledge, are broadly new. Among these are the following:—

1. A separator roll supported so that it will be freely movable both up and down, and a counter-balance therefor, whereby the traction of said separator roll may be varied as desired to adapt the machine for feeding different kinds of blanks and stocks which differ in thickness, stiffness and finish—that is which is smoother or rougher, as the case may be.

2. A separator roll supported so that it admits of a relatively wide range of adjustment towards and from the separator plate, together with means for effecting such adjustment; and 3. Provision for varying the inclination of the separator plate without varying the position of the free edge of said plate relative to the separator roll.

In detail, the construction of a separator mechanism constituting what I now consider to be the preferable embodiment of my invention and improvements relating thereto, designated as a whole E, is as follows:—The frame of said separator mechanism consists of a front member 78 and side members 79, $79^1$, rigidly secured to opposite ends of the front member 78 and which extend rearwardly therefrom and are substantially parallel with each other. Said frame is preferably stamped from suitable sheet steel—a desirable thickness being about 12 gauge—and is supported so as to be bodily movable both up and down. As shown, the front frame member 78 is secured to a rod 80 pivoted in the ends of arms 81 secured to and which project rearwardly from a rock shaft 82 mounted to turn in bearings formed in the side frame members $a$, $a^1$, said frame being supported in upright position by means of roller studs 83 on the side members 79, $79^1$, of the separator frame, which engage guide grooves or channels 84 in the inner sides of the side members $a$, $a^1$, of the main frame of the machine. The weight of the separator unit E is supported in part by a counter weight 85 which is adjustable endwise on a lever arm 86 secured to the rock shaft 82, a set screw 87 threaded to a hole formed in said weight in line with the lever 86, affording convenient means for securing said weight in different adjusted positions. Disengagement of the roller studs 83 from the guide grooves or channels 84 is prevented by means of a suitable stop which limits depression of the separator unit E. As shown, said stop consists of a block 88 secured to the side frame member $a^1$, the upper end of which is adapted to enter the guide groove or channel 84 in said frame member, said block being secured to said frame member $a^1$ so as to be adjustable vertically, simple means for this purpose consisting of a clamping screw 89 threaded into said side frame member and which extends through a slot 90 formed in a downward extension of the block 88.

The separator roll 91 is secured to a shaft 92 rotatably mounted in bearings formed in blocks 93, $93^1$, which are slidably supported on links 94, $94^1$ opposite ends of which are pivotally connected to rock arms 95 and 96 and $95^1$ and $96^1$, the rock arms 95, $95^1$ being pivoted to the side members 79, $79^1$ of the separator frame and the rock arms 96, $96^1$ being pinned or otherwise rigidly secured to the rod 80 to which the front transverse member 78 of the separator frame is secured. The rock arms 95 and 96 and $95^1$ and $96^1$ are of substantially the same length, as are also the links 94, $94^1$, the relation being such that the links 94, $94^1$ will be substantially horizontal in all pivotal positions of said rock arms.

With the described construction it is obvious that the rock arms 96, $96^1$ will be connected in fixed relation by the rod 80 to which said rock arms are rigidly secured.

The separator plate 97 is hinged to the upper edge of the front member 78 of the separator frame at the front side of the separator roll 91, preferably by means of a knuckle-joint, the separator frame member 78 and the separator plate 97 forming the leaves or straps of the hinge and the rod 80 the hinge pin or pintle.

The separator plate 97 is disposed with its free edge upwardly and is of such vertical dimension that its free edge will extend above a horizontal plane tangent to the under side of the separator roll, the relation being such that when the top blank of the pack B is in operative contact with the under side of the separator roll, its front edge will be below the free edge of said separator plate. As shown, said separator plate is supported and adapted to be adjusted pivotally by means of rigid connection with the rock arms 96, $96^1$, a convenient form of connection consisting of rods 98, $98^1$, rigidly secured in and which project inwardly from said rock arms 96, $96^1$, respectively, and which are rigidly secured to opposite ends of said separator plate.

In accordance with my invention, also, means are provided for adjusting the feed roll 91 towards and from the separator plate but without varying the position or inclination of said separator plate. As shown, the means for this purpose consists of rack bars 99, $99^1$, pivoted to the upper ends of the rock arms 95, $95^1$ and 96, $96^1$ in the same relation as the links 94, $94^1$, meshing with which, respectively, are gears 100, $100^1$, secured to a shaft 101 rotatably mounted in bearings in the blocks 93, $93^1$. With the described construction, rotation of the gear shaft 101 will operate to adjust the bearing block 93, $93^1$ and thus the separator roll 91, either towards or from the separator plate, as said shaft is turned in one direction or the other, without, however, affecting the pivotal adjustment of the separator plate. As shown, the gear shaft is adapted to be turned by means of a hand wheel 102 secured thereto, which, to provide for securing the separator roll in adjusted positions, is loose on the gear shaft 101 and is secured thereto by means of a pin 103 secured in said shaft which engages a slot 104 formed in the outer end of the hub of said hand wheel, and threaded to the end of said gear shaft outside of said hand wheel, is a clamping nut 105 adapted for clamping said hand wheel to the bearing block 93, thus preventing turning of said gear shaft and securing the bearing blocks 93, $93^1$ in fixed position on the links 94, $94^1$, and the separator roll 91 in fixed adjustment relative to the separator plate 97.

The object of the described adjustability of the separator roll and separator plate is for the purpose of adapting the machine for separating blanks of different kinds, particularly blanks differing in thickness and stiffness. For separating blanks which are relatively thick or stiff, the separator roll is adjusted away from the separator plate, and the separator plate is adjusted pivotally to increase its angle of inclination to the vertical; while for feeding thinner or more flexible blanks, the separator roll is adjusted towards the separator plate and the separator plate is adjusted pivotally to decrease its inclination to the vertical.

The rock arms 96, $96^1$ and thus the separator plate 97 are adapted to be adjusted pivotally to impart greater or less inclination to said separator plate by means of a thumb screw 106 secured against endwise movement in a stud 107 pivoted in a downward extension 108 of the rock arm 95, said thumb screw being threaded through a rod 109 fitted to turn in a hole formed in the outer end of a stud 110 secured in and which projects laterally from the side member 79 of the separator frame, holes being formed in opposite sides of said stud, through which the thumb screw 106 extends, said holes being sufficiently larger than the rod 109 to permit turning of said rod as the rock arm 95 is adjusted pivotally, that is without causing said thumb screw to come into contact with the sides of said holes, which would prevent further turning of said rod 109 and also of the rock arm 95 and of the downward extension 108 thereof.

When the clamping nut 105 is tightened to secure the gear shaft 101 from turning, thus securing the bearing blocks 93, 93¹ and the feed roll 91 in fixed position on the rack bars 99, 99¹, turning the thumb screw 106 will impart pivotal movement to the rock arms 96, 96¹ and to the separator plate 97 to impart greater or less inclination to said separator plate, but without varying the distance of the separator roll and the separator plate relatively to each other.

In practice, the separator plate 97 will have a capacity for adjustment through an angle of approximately 30 degrees, varying from a substantially vertical position at one limit to an upwardly and frontwardly inclined position of about 30 degrees to the vertical at the other limit of its adjustment, and the approximate inclination of said separator plate to the vertical is adapted to be indicated by means of graduations 111 on the outer side of a rearward projection 112 of the side member 79 of the separator frame and an index finger 113 formed at the extreme lower end of the downward extension 108 of the rock arm 95. As shown, the graduation marked "1" indicates the vertical position of said separator plate and each succeeding graduation—marked, respectively, "2", "3", "4" and "5"—an increment in the inclination of said separator plate to the vertical of approximately 6 degrees.

For reasons presently apparent, the bearing block 93¹ in which the feed roll shaft 92 is mounted, is cut away at its top side forming sections connected at their lower ends by a plate which forms an integral part of said block, the sections of said block being separated by a space or opening 114, see particularly Fig. 8.

While, as herein shown and described, the bearing blocks 93, 93¹ are slidably supported on both the links 94, 94¹ and on the rack bars 99, 99¹, my invention contemplates equally dispensing with the links 94, 94¹, and supporting said bearing blocks on the rack bars 99, 99¹ only.

In operation, step by step rotation is imparted to the separator roll shaft 92 in clockwise direction, Fig. 6, by means of driving connection with the oscillating lever 27, in the following manner:—Pivoted on the end of the sprocket wheel shaft 24 which projects through the side member $a^1$ of the main frame of the machine, is a bell-crank lever 115 mounted on one arm of which is a roller stud 116 which is adapted to run in contact with a cam 117 secured to the rock shaft 26, and applied to which is a spring 118 adapted to turn said bell-crank lever 115 pivotally in a direction to maintain the roller stud 116 in engagement with the tread of the cam 117. The opposite end of said bell-crank lever is connected by a link 119 with a lever arm 120 pivoted to the member $a^1$ of the main frame of the machine, and pivoted to the upper end of said lever arm 120 is a rack bar 121, the teeth of which mesh with the teeth of a spur gear 122 on the separator roll shaft 92, which is adapted to be connected to said shaft by a ratchet gear comprising a ratchet wheel 123 secured to the gear 122 so as to rotate therewith, a casing or pawl carrying member 124 secured to the separator roll shaft, see particularly Fig. 9, and pawls 125 on said pawl carrying member which are adapted to engage the teeth of the ratchet wheel 123 when rotation is imparted to said ratchet wheel by the gear 122 in a direction corresponding to rotation of the separator roll 91 to withdraw a blank from the top of the pack B.

As shown, the ratchet pawls 125 are mounted on the outer surface of a flange 126 forming part of the casing or pawl carrier 124, the contacting surfaces of said flange 126 and of the pawls 125 being circular and of substantially the same radius. The pawls 125 are provided with holes which are adapted to engage and are loosely fitted to studs 127 secured in the flange 126, said pawls being held yieldingly in engagement with the studs 127 by means of leaf springs 128 secured to said flange, the free ends of which bear upon the outer sides of said pawls. Any stresses to which the pawls 125 are subjected in the operation of the machine, are sustained by projections 129 at the rear ends of said pawls which engage slots formed transversely in the flange 126 of the pawl carrier. The ends of the pawls 125 which engage the teeth of the ratchet wheel 123 are turned inwardly and extend through holes or openings 130 formed in the flange 126 of the pawl carrier. I do not, however, desire to limit myself to the particular form of ratchet gear shown, as my invention contemplates the use of any desired form of ratchet suitable for the purpose.

The rack formed on the rack bar 121 is maintained in engagement with the teeth of the gear 122 by means of a retainer 131 pivoted to the separator roll shaft 92, a flange 132 on which extends over and has sliding engagement with the upper surface of said rack bar.

With the described construction, it is obvious that pivotal movement of the bell-crank lever 115 by the cam 117 and by the spring 118, through its described connection with the separator roll shaft 92, will operate to impart step by step rotation to said separator roll shaft and to the separator roll 91 in a direction to effect separation of blanks from the pack B, the relation, as shown, being such that rotation to effect separation of the blanks will be produced by pivotal movement of said bell-crank lever 115 by the cam 117, the idle position of said separator roll and shaft corresponding to pivotal movement of said bell-crank lever by the spring 118.

In practice, the operative length of the rack bar actuating lever 120 is so proportioned to the distance from the pivotal axis of said lever to the point of pivotal connection thereto of the link 119, that rotation through a relatively long arc and at a relatively high rate of speed will be imparted to the separator roll. As shown, the relation is such that the endwise travel of said rack bar will impart approximately one complete revolution to the separator roll. Obviously, however, this relation admits of a wide range of variation.

It is found in practice that due to the formation on the separator roll 91 of a coating of lint, dust and other dirt in finely comminuted form, the surface of said roll becomes glazed after a short time and loses its traction to a considerable extent, as a result of which its feeding action becomes imperfect. To remedy this condition, I provide what may appropriately be designated a separator roll dresser, comprising an abrading surface adapted to rest lightly in contact with the tread of the separator roll, said abrading surface operating to remove the glazed coating from said roll and thus restore its traction and normal operation.

As shown, see particularly Figs. 12 and 13, said separator roll dresser comprises a plate 133, the rear end of which is attached to a rod 134, supported and free to turn in bearings formed in lugs 135 on the blocks 93, 93$^1$, in which the separator roll shaft is mounted. Preferable means for attaching said plate 133 to the rod 134, consists of lugs 136 on said plate provided with holes 137 through which the rod 134 passes, both said holes and the section of said rod which engages the same being square. The holes 137 are slightly larger than the cross section of the square portion of the rod 134, thus permitting free movement of the plate 133 within limits, but without permitting said plate to turn on said rod.

The portion of the plate 133 directly above the separator roll 91 is struck up as shown at 138, and secured to the under side of said plate and extending across the open side of the recess formed by the struck-up portion thereof, is a plate 139 which also comprises a struck-up portion 140 proportioned to enter the recess in the plate 133 formed by the struck-up portion 138 thereof, and clamped between said plates 133 and 139 at opposite sides of the recess formed by the struck-up portion 138 of the plate 133, is a strip 141 of emery cloth or other suitable abrading material adapted to contact directly with the tread of the separator roll. As shown, said strip of abrading material 141 is adapted to be clamped between the plates 133 and 139 by means of a screw stud 142 secured in the plate 139 and which extends through a hole in the plate 133 and threaded to which above the plate 133 is a nut 143.

By "separator roll" as used herein, I include both a continuous separator roll and a separator roll which consists of a plurality of relatively short sections secured to the shaft 92 in spaced relation.

When the separator roll consists of separate sections, a roll dresser will be provided for each of said sections, said dressers, respectively, being maintained in engagement with the different sections of said roll by lugs 144 on the plate 133 which embraces opposite sides of said separator roll sections.

I have found from experience, that an occasional application of my improved separator roll dresser is sufficient to secure normal operation of said separator roll, which, at other times, may and preferably will be raised and secured out of contact with said separator roll. The rod 134 affords convenient means for turning the separator roll dressers into and out of operative position, their inoperative position being defined by means of contact of an arm 145 secured to said rod with a rigid stop on the machine frame, said arm 145 also affording convenient means for turning said rod 134.

Associated with the separator roll 91 and the separator plate 97 are pull-out rolls 146 and 147, the roll 146 being a driven roll and the roll 147 being rotated by contact with said driven roll, or with a blank passing between said rolls. As shown, the pull-out roll 146 is continuous, while the roll 147 consists of different sections.

In the operation of the machine, the roll 146 is adapted to be driven continuously by means of driving connection with a suitable source of power, usually a driven part of the machine in connection with which my improved machine is used. As shown, said roll is adapted to be driven by means of a belt, not shown, applied to a pulley 148 secured to the shaft of the roll 146.

The idle roll 147 is arranged above the roll 146 and to provide for raising said roll to render the roll 146 accessible, the shaft 149 of said roll 147 is rotatably mounted in bearings formed in arms 150, 150$^1$, rigidly secured to a rock shaft 151, rotatably mounted in bearings at the upper end of the side members $a$, $a^1$ of the main frame of the machine.

The roll 147 is adapted to be maintained yieldingly in contact with the roll 146 and also in raised position by means of a spring 152 which connects an arm 153 secured to the rock shaft 151 with a rigid part of the machine frame, the connection of said spring to said arm comprising a rod 154, said rod being upwardly bowed to permit the arm 153 to be turned beyond its dead point relatively to the point of support of the opposite end of the spring 152 when the arms 150, 150¹ are raised into vertical position, the extreme upward position of said arms being defined by contact of the rod 154 with the rock shaft 151.

In certain applications, my improved separating machine comprises a conveyor board adapted for delivering blanks withdrawn from the pack B by the separator roll 91 and the pull-out rolls 147, 148 to the feed devices of the machine in connection with which my improved machine is used, said conveyor board also comprising means for jogging the blanks before they are delivered to and gripped by the feed devices of said machine.

As shown, said conveyor board, designated as a whole F, comprises a rigid frame formed by side frame members 155, 155¹, preferably made of flat bar iron, said side frame members being rigidly connected by transverse frame members 156, 157, preferably consisting of iron rods, and secured between the side frame members 155, 155¹ is a board 158, said board fitting between said side frame members and being rigidly secured thereto by screws, in such position that the top thereof will be substantially flush with the upper edges of said side frame members.

At its upper end, the conveyor board F is connected to the main frame of the machine, preferably by a pivotal connection, so that said conveyor board may be raised bodily to provide access to parts of the machine in connection with which my improved separator machine is being used, which, in operation, are covered by said separator board.

As shown, the connection of said conveyor board to the side frame members $a$, $a^1$ of the machine consists of a shaft 159 rotatably mounted in bearing sleeves or bushings 160, 160¹, secured in over-lapping lugs 161, 161¹ and 162, 162¹ formed, respectively, on the upper ends of the side frame members 155, 155¹, of the conveyor board F and on the side frame members $a$, $a^1$ of the main frame of the machine. The bearing sleeves or bushings 160, 160¹ are held against rotation by suitable means, consisting, as shown, of plates 163 secured to the side frame members 155, 155¹ of the conveyor board, formed in the ends of which are slots which are adapted to embrace the bottoms of corresponding grooves 164 formed in said sleeves. Also, to provide for quickly and conveniently detaching the conveyor board F from the main frame of the separator machine, the bearing sleeves or bushings 160, 160¹ are secured in open sided slots 165 formed in the bearing lugs 162, 162¹ on the side frame members $a$, $a^1$, and are retained in engagement with said slots by means of clips secured to said brackets and which extend over and contact with the upper sides of the bearing sleeves or bushings 160, 160¹.

To provide for rigidly supporting the conveyor board F and at the same time permitting the free end thereof to be raised, the connection of said board with the machine in connection with which my improved machine is to be used consists of arms 166, 166¹ pivoted adjacent to the lower ends of the side frame members 155, 155¹, the ends of which are adapted to abut against shoulders on rigid parts of the machine in connection with which my improved separator machine is being used, indicated at 167, said arms 166, 166¹ with the side frame members 155, 155¹, forming in effect toggle levers, and flexure of said arms relatively to said side frame members being limited by rigid stops 168 on said arms adapted to contact with the under sides of said side frame members preferably just after said arms have passed their dead points.

In practice, the frame of my improved machine will be rigidly secured to the frame of the machine with which it is being used and the arms 166, 166¹ are so proportioned that when their ends are engaged with the shoulders 167 and the conveyor board, as a whole, depressed to straighten said arms and bring the stops 168 thereon into contact with the frame members 155, 155¹, the toggle action of said arms will cause their ends to react against the shoulders 167, producing a strong thrust which will be transmitted through the side frame members 155, 155¹, to the frame of my improved separator machine, thus securing said conveyor board rigidly in position, while at the same time offering no resistance to raising the same.

Secured to rotate with the shaft 159 is a roller 169 and rotatably mounted in the side frame members 155, 155¹ of the conveyor board F adjacent to its free end, is a roller 170.

The rollers 169 and 170 are so positioned that their upper surfaces extend flush with the top surface of the board 158, and adjusted to said rollers are tapes 171, the upper laps of which rest upon said board.

The conveyor board F also comprises an upper section supported above the main section thereof and in spaced relation thereto, said upper section comprising a suitable frame formed by side members 172, 172' rigidly connected by transverse members 173, 173¹, all of said frame members being made of flat bar steel.

To render the board 158 conveniently accessible, the frame of the upper section of the conveyor board is pivotally supported at one edge by means of pivot studs 174 on the frame member 172¹, which engages pivot bearings in upright posts or standards 175 secured to the side frame member 155¹ of the main conveyor board section. At its opposite edge, the position of the upper section of said conveyor board relative to the main section thereof, is defined by contact of the lower ends of turned down portions 176 of the transverse frame members 173, 173¹ with rigid parts of the main section of the conveyor board, the turned down portion of the lower transverse frame member 173¹ preferably engaging the transverse frame member 157 of the frame of the main section of said conveyor board, being provided with a notch 177 fitted to said frame member 157, thus holding the upper frame section of said carrier board rigidly in position. As shown, the upper section of said conveyor board is held yieldingly in position with the lower ends of the supports 176 in designed contact with the lower conveyor board section by means of a spring catch 178 secured to the lower conveyor board section which is adapted to engage a rigid projection 179 on the upper section of said conveyor board.

Rotatably mounted on the upper section of the conveyor board F are idle rollers 180 which, in operation, are adapted to run in contact with the tapes 171. As shown, said rollers are secured in slidable engagement with shafts 181, the ends of which are confined in guide grooves 182 formed in blocks 183, 183¹, provided with bearings slidably fitted to the side frame members 172, 172¹ of said upper conveyor board section, and adapted to be secured thereto in different adjusted positions by means of clamping screws 184. At their lower ends, the guide grooves 182 are preferably contracted so that they will be narrower than the diameter of the shafts 181. The shafts 181 are confined in the grooves in the bearing blocks 183 by means of spring catches 185 which extend over the tops of said grooves and partially close the same, thus holding said shafts yieldingly in engagement with said slots. The opposite ends of said shafts may be confined in the guide grooves 182 in the bearing blocks 183¹ in the same manner, though I prefer the construction shown, in which they are confined in said grooves by means of rigid clips 186.

The position of the tapes 171 is defined by spaced pins 187 secured in a rod 188 supported beneath the lower section of the conveyor board F, over which the lower laps of said tapes pass, each thereof being confined in the space between adjacent pins 187. To provide for adjusting the tension of said tapes, the rod 188 is preferably supported so as to be adjustable. As shown, the rod 188 is secured in the ends of arms 189 pivoted to the side frame members 155, 155¹ of the lower conveyor board section, and which are adapted to be secured in adjusted positions, corresponding to desired tension of the tapes 171, by means of clamping screws applied thereto.

Supported on the frame of the upper conveyor board section in spaced relation to the board 158 and extending lengthwise thereof, are strips 190, preferably made of wood and supported in edgewise position. As shown, said strips 190 are detachably secured to the transverse frame members 173, 173¹, by clips 191 comprising spring members 192 adapted to extend over said frame members. In what I now consider to be preferable practice, the idle rollers 180 are of considerable size, say two inches (2″) in diameter, and the strips 190 are supported in such relation thereto that their lower edges will be only a short distance above the lower sides of said rollers, say one quarter of an inch (¼″). With this relation, said strips will operate to guide blanks delivered upon the conveyor board F from the separator machine, between the tapes 171 and the rollers 180. Said strips will also prevent light blanks from being blown off from the conveyor board by drafts of air from an open window or the like.

In operation, the roll 169 is driven by means of driving connection with a source of power, usually a driven part of the machine in connection with which the machine is being used, as by a belt adjusted to a driven pulley on said machine, not shown, and a pulley 193 secured to the shaft 159 of said roll. Rotation of said roll 169 will impart endwise movement to the tapes 171, which, in turn, will impart rotation to the idle rolls 180, whereby blanks delivered upon the conveyor board F from the pack B, will be carried downward along said conveyor board and delivered to the machine in connection with which my improved machine is being used.

From the pull-out rolls 146, 147, the blanks withdrawn from the pack B are guided between the strips 190 and the tapes 171 by a plate 194 supported by a bar 195 secured to the ends of the arms 150, 150¹ on the rock shaft 151, preferably in such manner as to be adjustable both towards and from the pull-out rolls and vertically towards and from the top side of the roll 169 and the tapes 171 adjusted thereto. As shown, the means for securing said bar 195 to said arms consists of clamping screws 196 inserted through slots formed in the ends of said arms and in the turned-up ends 197 of said bar. To prevent the blanks from catching on the upper ends of the strips 190, the lower edges of said strips are inclined or bevelled at their upper ends, as shown at 198.

In Fig. 15, the conveyor board F is shown in operative position in full lines and in raised position in dotted lines, in which position it is adapted to be secured by a hook 199 pivoted to the member a of the main frame of my improved separator machine, which is adapted to engage a rigid stud 200 secured to the side frame member 155 of the main conveyor board section.

Before the conveyor board can be raised, it will be necessary first to turn the plate 194 into its raised position as shown in dotted lines in Fig. 6ª.

The blanks delivered upon the conveyor board F are adapted to be jogged by means on said conveyor board, before they are delivered to the machine to which my improved separator machine is applied.

As shown, said jogging means consists of a push bar 201 and stop fingers 202 which depend from a bar 203 supported on the lower transverse frame member 173¹ of the upper conveyor board section, preferably in such manner that it will be adjustable transversely of the conveyor board, being stationary in its adjusted position during operation of the machine.

The push bar 201 is supported upon a rod 204, preferably in such manner as to be adjustable transversely of the conveyor board and also pivotally, to provide for jogging blanks the sides and ends of which are not perfectly square to each other—either from design or through carelessness in cutting them—said rod 204 being movable endwise in suitable bearings formed in the side frame members 155, 155¹ of the main section of the conveyor board, said rod being held against rotation by engagement of the end 204¹ thereof, which is bent so as to extend parallel with and in spaced relation to the main section of said rod and is slidable in a bearing in the side frame member 155.

As shown, the means for supporting said push-bar consists of a block 205 secured thereto, said block being provided with a bearing fitted to which is a stud 206 formed on a block 207 slidable on the rod 204, set screws 208, 209, having screw threaded engagement, respectively, with holes formed through the block 205 and lengthwise through the stud 206 and block 207, affording convenient means for securing said block 205 in adjusted angular positions on said stud 206 and the block 207 in adjusted lengthwise positions on the rod 204.

The stop fingers 202 are held yieldingly in position on the bar 203 by means of light springs applied thereto, constructed and arranged to permit said fingers to yield under slight pressure. Specifically, said stop fingers comprise portions 210 at their upper ends which are bent so as to extend substantially at right angles to the fingers proper, said bent over portions resting upon the top side of the bar 203 and being held yieldingly in position thereon by light coiled springs 211 inserted over studs 212 secured in the bar 203, so as to react between the bent over portions 210 of said fingers and nuts threaded to the upper ends of said studs, the holes in the turned over portions 210 of said fingers being sufficiently larger than the studs 212 to permit contemplated play of said stop fingers.

In the operation of the machine, endwise movement is adapted to be imparted to the rod 204 to maintain the push bar 201 at the limit of its retraction from the stop fingers 202, by a spring applied thereto consisting, as shown, of a coiled spring 213 which surrounds said rod 204 and reacts between the side frame member 155¹ of the main section of the conveyor board and a collar 214 secured to said rod, preferably by means of a set screw or the like, whereby said collar is rendered adjustable on said rod, thus providing for varying the tension of the spring 213.

In the operation of the machine, the push bar 201 is adapted to be advanced intermittently towards the stop fingers 202 by means of a cam 215, which has operative engagement with a stud 216 secured to the end of the rod 204, which projects through the side frame member 155¹ of the main conveyor board section. As shown, the cam 215 is formed on a plate 217 and is maintained in engagement with the stud 216 by means of a retaining guide 218 provided with slotted bearings to which the plate 217 is slidably fitted. Said retaining guide is supported upon a sleeve 219 fitted to the rod 204 outside of the frame member 155¹.

In operation reciprocating movement is imparted to the cam plate 217 by means of a link 220 which connects said cam plate with an arm 221 on the clutch head 33 secured to the rock shaft 26 of the separator machine, whereby the jogger bar 201 will be advanced towards the stop fingers 202 every time the separator roll 91 and associated parts are actuated, though the timing need not be synchronous.

My improved separator machine as shown in Figs. 1 to 17, is adapted for feeding practically all kinds of blanks, including envelopes and filing cards. Due to the comparative thickness of envelopes, cards and other similar blanks, however, only a relatively small number thereof can be placed in the machine at a time and these will soon be exhausted, necessitating that the machine be stopped at short intervals to place a new pack of blanks therein. This frequent stopping of the machine to renew the stock of blanks, involves a considerable loss of time in operation and output which it is desirable to avoid, and to this end, I have devised an adaptation of my machine whereby the pack of envelopes, cards and other relatively thick stiff blanks may be replenished without stopping the machine, thus providing for operating the machine continuously without loss of time or output. This adaptation of my improved machine is illustrated in Fig. 18 of the drawings, and will now be described.

To thus convert and adapt my improved separator machine for continuous operation, I provide a pack-box or receptacle, which is supported upon the pack-carriage C and is formed in part by the angle bars 12, 12¹ and the rearward extensions 14, 14¹ thereof. Said pack-box or magazine also comprises an upwardly and rearwardly incline plate 222 supported upon the arms 8 of the brackets 5, 5¹, preferably in such manner that it may be adjusted vertically, to provide for varying the inclination of the blanks contained in the pack-box or magazine, as will presently appear. As shown, said plate 222 is supported by a plate 223 secured directly to the bars 16, 16¹, on the bracket arms 8, being preferably secured thereto by a clamping nut 224 threaded to a stud 225 secured to the under side of the plate 222 and which extends through a slot 226 formed in the plate 223.

The pack of blanks B¹ is adapted to be confined on the plate 222 by a frontward, substantially horizontal extension 227 formed at the lower edge of said plate 222, as will presently appear.

As thus adapted for continuous operation, the separator roll and shaft 91, 92 and the separator plate 97 are not utilized in the relation shown in figures of the drawings other than Fig. 18, separation of the blanks from the pack B¹ being effected by means of a separator roll 91¹ secured to a shaft 92¹ mounted to turn freely in bearings formed in the lateral flanges of the angle bars 12, 12¹ in co-operation with a separator plate 97¹. The shaft 92¹ is connected in train with the stub shaft extension 228, by which the separator shaft 92 of the main embodiment of the invention is driven, by gears 229 and 230 secured, respectively, to said stub shaft and to the shaft 92¹ and intermediate gears, comprising a gear 231 mounted on a stud 232 secured in the bearing block 93¹ of the separator unit E, which meshes with the gear 229 and with a gear 233 mounted on a stud 234 secured in an arm 235 rigidly secured to the side frame member 79¹ of the separator unit E of the primary machine. Said gear 233 also meshes with the gear 230 secured to the separator shaft 92¹. The different gears are proportioned to impart rotation to the separator roll 91¹ through an arc of sufficient length to deliver the advancing edges of the separated blanks to the pull-out rolls 146, 147.

The front blank of the pack B¹ rests in contact with the separator roll 91¹ and the pack is adapted to be advanced into contact with said separator roll with sufficient force so that the traction of said roll will operate to withdraw the front blank from the pack-box, and, in co-operation with the separator plate 97¹ will deliver withdrawn blanks to the pull-out rolls 146, 147.

The separator plate 97¹ is supported above the separator roll 91¹ and comprises a front portion 236 which extends substantially parallel with the frontward extension 227 of the plate 222, the relation being such that the separator roll 91¹ will support the pack of blanks B¹ in edgewise position on the plate 222, while the weight of said pack, or other means applied thereto, will tend to force the lower ends of said blanks frontwards onto the extension 227 of the plate 222, which will operate to lift the blanks as they pass onto said extension, to bring their upper edges into contact with the front section 236 of the separator plate 97¹, the relation being such, also, that the front blank will engage said separator plate closely adjacent to its free edge, whereby the traction of the separator roll 91¹ will operate to force said front blank off from the edge of the separator plate and to advance it between the pull-out rolls. Said separator plate also comprises a rear section which diverges upwardly and rearwardly at a slight angle relatively to the plate 222.

As previously suggested, to adapt the machine, as converted for continuous operation, for separating blanks which present different resistances to the action of the separator devices as, for example, blanks of different degrees of stiffness, means are provided for varying the relative inclination of the blanks relatively to the separator plate 97¹. This may be effected either by changing the angular adjustment of the separator plate on the shaft 101 or by raising or lowering the supporting plate 222—raising said plate operating to increase the inclination of the blanks relative to the separator plate, and lowering said plate 222 operating to decrease the inclination of the blanks relative to said separator plate. In other words, to adapt the machine for feeding relatively flexible blanks, adjustment will be made so that the blanks will extend at a less angle to the vertical, while for feeding stiffer blanks, adjustment will be made so that the blanks will extend at greater angles to the vertical.

Variations in the vertical adjustment of the extension 227 of the plate 222 may be compensated for by raising or lowering the pack-carriage C by the crank 73, as the case may be. Similarly the plate 222 may be raised or lowered bodily in any given adjustment relative to the separator roll, by raising or lowering said pack-carriage, thus adapting the machine for operating on blanks of different lengths.

As shown, the separator plate 97¹ is supported upon the gear shaft 101 of the separator unit E by hangers 238 thereon, which extend over said shaft and are adapted to be secured thereto in different angular positions by set screws threaded through holes therein, the ends of which bear against said shaft 101.

When my improved machine is converted to adapt it for continuous operation in the manner described, the separator roll and shaft 91, 92, will be removed.

Also, when my improved machine is converted to adapt it for continuous operation, means are provided for rendering the feed mechanism for raising the pack-carriage C inoperative and for securing the separator unit E in vertical adjustment corresponding to desired proximity of the separator roll $91^1$ to the separator plate $97^1$.

While I contemplate the use of any desired or approved means for this purpose, simple means for thus rendering the pack-carriage operating mechanism inoperative consists of a hook 239 pivoted to the side frame member $a$ of the main frame of the machine, which is adapted to engage a hook 240 secured in the link 58 and which is adapted to engage the pawl arm 53 in depressed position in which the actuating pawl 52 will be inoperative. Also, the separator unit E may conveniently be secured in vertical adjustment corresponding to desired proximity of the separator roll $91^1$ relative to the separator plate $97^1$, by means of a thumb screw 241 having screw threaded engagement with a hole formed in the side frame member $a^1$ of the main frame of the machine, the end of which is reduced, and is adapted to engage a corresponding hole formed in the side frame member $79^1$ of the separator unit E.

With the described construction, it is obvious that raising of the pack-carriage C by the power feed will be prevented, while downward movement of said pack-carriage will be prevented by engagement of the retaining pawl 52 with the teeth of the ratchet wheel 49.

With my improved machine, converted as described for continuous operation, it is obvious that whenever the quantity of blanks in the pack-box becomes low, blanks may be inserted into the pack-box at the rear of those which it contains, without stopping the machine or in any way interfering with its operation.

The separator mechanism of my improved machine, as converted for continuous operation, is the same in principle and method of operation as the separator mechanism of the machine which forms the subject-matter of my copending application Serial No. 335,473 filed November 3, 1919 (being a renewal of application Serial No. 49,902, filed September 10, 1915), and for this reason is not herein claimed.

I claim—

1. In a blank separating machine, the combination of vertically movable pack supporting means, actuating means therefor, and blank separating means comprising a separator roll rotatably mounted above said pack supporting means in position to contact with the uppermost blank of a pack supported thereby, and a separator plate in association with said separator roll, said separator roll and plate forming parts of a separator unit supported so as to be vertically movable, the relation being such that in operation the separator roll will rest upon the pack of blanks, and means for imparting intermittent rotation to said separator roll.

2. A blank separating machine as specified in claim 1, in which the separator roll is adjustable towards and from the separator plate, and which comprises means for adjusting said separator roll.

3. A blank separating machine as specified in claim 1, in which the separator plate is adjustable to vary its inclination, and which comprises means for varying the inclination of said separator plate.

4. A blank separating machine as specified in claim 1, in which the separator roll is adjustable towards and from the separator plate, and the separator plate is adjustable to vary its inclination, and said separator roll and plate are adjustably connected to provide for varying the inclination of said separator plate while maintaining the position of the separator roll relative to the free edge of the separator plate substantially constant, and which comprises means for adjusting said separator roll towards and from said separator plate and for adjusting said separator roll and plate together.

5. Blank separating mechanism for a machine of the type specified, comprising in combination, a separator roll and plate, said separator roll being adjustable towards and from said separator plate, and means for effecting adjustment of said separator roll and for securing it in adjusted positions.

6. Blank separating mechanism for a machine of the type specified, comprising in combination, a separator roll and plate, said separator roll and plate being adjustably connected to vary the inclination of said plate while maintaining the position of the separator roll relative to the free edge of said plate substantially constant, and means for thus adjusting said separator roll and plate.

7. Blank separating mechanism for a machine of the type specified, comprising in combination, a separator roll and plate, said separator roll being adjustable towards and from said separator plate, and said separator roll and plate being adjustably connected to provide for varying the inclination of said separator plate while maintaining the position of the separator roll relative to the free edge of the separator plate substantially constant, means for adjusting said separator roll towards and from the separator plate, and means for adjusting said separator roll and plate together.

8. A blank separating machine as specified in claim 1, in which the frame of the separator unit is pivotally supported and is guided by engaging projections and guide grooves formed one on the frame of the separator unit and the other on the main frame of the machine.

9. A blank separating machine as specified in claim 1, in which the frame of the separator unit is pivoted to pivotally supported arms.

10. A blank separating machine as specified in claim 1, in which the means for supporting the separator unit comprises a rock shaft, arms secured thereto to which the frame of the separator unit is pivoted, and a counterweight therefor which is adjustable endwise on an arm secured to said rock shaft.

11. A blank separating machine as specified in claim 1, in which the separator roll is adjustable towards and from the separator plate, the means for mounting said separator roll comprising bearing blocks therefor, rack bars supported on the frame of the separator unit on which said bearing blocks are slidably supported, a gear shaft rotatably mounted in said bearing blocks and gears secured to said gear shaft which engage the teeth on said rack bars.

12. A blank separating machine as specified in claim 1, in which the separator roll is adjustable towards and from the separator plate, the means for mounting said separator roll comprising bearing blocks therefor, rack bars on which said bearing blocks are slidably supported, a gear shaft rotatably mounted in said bearing blocks, gears secured to said gear shaft which engage the teeth on said rack bars, and means for securing said bearing blocks in adjusted positions.

13. A blank separating machine as specified in claim 1, in which the separator roll is adjustable towards and from the separator plate, the means for mounting said separator roll comprising bearing blocks therefor, rack bars on which said bearing blocks are slidably supported, a gear shaft rotatably mounted in said bearing blocks, gears secured to said gear shaft which engage the teeth on said rack bars, and means for securing said bearing blocks in adjusted positions, comprising a hand wheel secured to the gear shaft so as to be movable endwise thereon, the hub of which is interposed between a bearing block and a clamping nut threaded to said gear shaft.

14. A blank separating machine as specified in claim 1, in which the separator plate is pivotally adjustable to vary its inclination and which comprises means for effecting such pivotal adjustment thereof, the means for supporting and adjusting said separator plate comprising a rod mounted to turn in the frame of the separator unit, arms on said rod to which the separator plate is connected so as to turn therewith, and means for turning said arms pivotally.

15. A blank separating machine as specified in claim 1, in which the separator plate is pivotally adjustable to vary its inclination and which comprises means for effecting such pivotal adjustment thereof, the means for supporting and adjusting said plate comprising a rod mounted to turn in the frame of the separator unit, arms on said rod, said separator plate being connected both to said pivot rod and to said arms so as to turn therewith, and means for turning said arms pivotally.

16. A blank separating machine as specified in claim 1, in which the separator roll is adjustable towards and from the separator plate and said separator roll and plate are adjustable together to provide for varying the inclination of said separator plate while maintaining the position of said separator roll relative to the free edge of said separator plate substantially constant, and which comprises means for adjusting said separator roll towards and from said separator plate and for effecting adjustment of said separator roll and plate together, comprising bearing blocks therefor, rack bars on which said bearing blocks are slidably supported, a gear shaft rotatably mounted in said bearing blocks, gears secured to said shaft which engage the teeth of said rack bars, each of said rack bars being pivotally connected to arms pivoted in pairs on opposite sides of the frame of the separator unit, means rigidly connecting the front rack bar supporting arms, connection between said arms and the separator plate, and means for turning said arms pivotally.

17. A blank separating machine as specified in claim 1, in which the separator roll is adjustable towards and from the separator plate and said separator roll and plate are adjustable together to provide for varying the inclination of said separator plate while maintaining the position of said separator roll relative to the free edge of said separator plate substantially constant, and which comprises means for adjusting said separator roll towards and from said separator plate and for effecting adjustment of said separator roll and plate together, comprising bearing blocks therefor, rack bars on which said bearing blocks are slidably supported, a gear shaft rotatably mounted in said bearing blocks, gears secured to said shaft which engage the teeth of said rack bars, each of said rack bars being pivotally connected to arms pivoted in pairs on opposite sides of the frame of the separator unit, a rod mounted to turn in bearings in the frame of the separator unit to which the front rack bar supporting arms are rigidly secured, connection between said arms and the separator plate, and means for turning said arms pivotally.

18. A blank separating machine as specified in claim 1, in which the separator roll is adjustable towards and from the separator plate and said separator roll and plate are adjustable together to provide for varying the inclination of said separator plate while maintaining the position of said separator roll relative to the free edge of said separator plate substantially constant, and which comprises means for adjusting said separator roll towards and from said separator plate and for effecting adjustment of said separator roll and plate together, comprising bearing blocks in which the separator roll is mounted, rack bars on which said bearing blocks are slidably supported, a gear shaft rotatably mounted in said bearing blocks, gears secured to said shaft which engage the teeth of said rack bars, each of said rack bars being pivotally connected to arms pivoted in pairs on opposite sides of the frame of the separator unit, a rod mounted to turn in bearings in the frame of the separator unit to which both the separator plate and the front rack bar supporting arms are connected so as to turn therewith, connection between said arms and the separator plate, and means for turning said arms pivotally.

19. A blank separating machine as specified in claim 1, in which the separator plate is pivotally adjustable to provide for varying its inclination, and which comprises means for effecting pivotal adjustment thereof, the means for supporting and adjusting said plate comprising a rod mounted to turn in the frame of the separator unit, arms secured to said rod to which the separator plate is connected so as to turn therewith, and means for turning said arms pivotally comprising a screw connection of a rack bar supporting arm with a fixed part of the frame of the separator unit, said connecting screw having threaded engagement with one thereof and being rotatably secured against endwise movement to the other.

20. A blank separating machine as specified in claim 1, in which the separator roll is adjustable towards and from the separator plate, the means for adjustably mounting said separator roll comprising bearing blocks therefor, rack bars and links supported on the frame of the separator unit on which said bearing blocks are slidably supported, a gear shaft rotatably mounted in said bearing blocks and gears secured to said gear shaft which engage the teeth on said rack bars.

21. A blank separating machine as specified in claim 1, in which intermittent rotation is adapted to be imparted to the feed roll by means comprising a pinion mounted to turn on the feed roll shaft, a ratchet adapted for securing said pinion to said shaft when turned in one direction, a rack bar which engages said pinion, a pivoted arm to which said rack bar is connected, a pivoted lever, a link which connects an arm of said lever with the lever arm to which the rack bar is connected, a spring applied to said lever adapted for turning it in one direction, and means for turning said lever against the force of the spring applied thereto.

22. A blank separating machine as specified in claim 1, in which intermittent rotation is adapted to be imparted to the separator roll by means comprising a pinion mounted to turn on the separator roll shaft, a ratchet adapted for securing said pinion to said shaft when turned in one direction, a rack bar which engages said pinion, a pivoted arm to which said rack bar is connected, a pivoted lever, a link which connects an arm of said lever with the lever arm to which the rack bar is connected, a spring applied to said lever adapted for turning it in one direction, and means for turning said lever against the force of the spring applied thereto.

23. A blank separating machine as specified in claim 1, in which intermittent rotation is adapted to be imparted to the separator roll by means comprising a pinion mounted to turn on the separator roll shaft, a ratchet adapted for securing said pinion to said shaft when turned in one direction, a rack bar which engages said pinion, a pivoted arm to which said rack bar is connected, a pivoted lever, a link which connects an arm of said lever with the lever arm to which the rack bar is connected, a spring applied to said lever adapted for turning it in one direction, and means for turning said lever against the force of the spring applied thereto, the relation being such that the distance between the point of attachment of the link to the lever arm to which the rack bar is pivoted and the pivot of said lever arm is relatively much shorter than the distance from said point of attachment to the point at which the rack bar is connected thereto.

24. A blank separating machine as specified in claim 1, in which intermittent rotation is adapted to be imparted to the separator roll by means comprising a pinion mounted to turn on the separator roll shaft, a ratchet adapted for securing said pinion to said shaft when turned in one direction, a rack bar which engages said pinion, a pivoted arm to which said rack bar is connected, a pivoted lever, a link which connects an arm of said lever with the lever arm to which the rack bar is connected, a spring applied to said lever adapted for turning it in one direction, and means for turning said lever against the force of the spring applied thereto, the relation being such that the distance between the point of attachment of the link to the lever arm to which the rack bar is pivoted and the pivot of said lever arm is relatively much shorter than the distance from said point of attachment to the point at which the rack bar is connected thereto, and the over-all length of said lever arm is several times the distance from the pivot thereof to the point at which the link connecting said arm with the actuating lever is connected thereto.

25. In a blank separating machine, the combination with the separator roll of a dresser therefor comprising a frame which carries an even, relatively fixed surface having a coating of abrasive material, and means for supporting said frame constructed and arranged to permit the abrading material to rest lightly in contact with the tread of the separator roll.

26. A blank separating machine as specified in claim 25, in which the means for supporting the dresser frame is constructed and arranged for moving and supporting said dresser out of contact with the tread of the separator roll.

27. A blank separating machine as specified in claim 25, in which the means for supporting the dresser frame comprises a rod mounted adjacent to the separator roll and which comprises flat sided sections, and lugs on the dresser frame provided with holes shaped to receive the flat sections of said rod, and a stop adapted to limit turning movement of said rod to move said dresser out of contact with the separator roll into a position in which they will be held stable by gravity.

28. A blank separating machine as specified in claim 25, in which the dresser frame comprises depending flanges adapted to embrace the separator roll to prevent displacement of said dresser relative thereto.

29. A blank separating machine as specified in claim 25, in which a strip of abrading material is clamped between opposed members of the dresser frame, both of which comprise struck up portions forming recesses across the open sides of which the strip of abrading material extends, the struck up portion of the overlying frame member being proportioned to receive the struck up portion of the other, and the ends of the struck up portions of the underlying frame member being slotted to permit the strip of abrading material to pass therethrough.

30. A blank separating machine as specified in claim 25, in which a strip of abrading material is clamped between opposed members of the dresser frame, both of which comprise struck up portions forming recesses across the open sides of which the strip of abrading material extends, the struck up portion of the overlying frame member being proportioned to receive the struck up portion of the other, and the ends of the struck up portions of the underlying frame member being slotted to permit the strip of abrading material to pass therethrough, and the overlying member having marginal flanges forming a channel adapted to receive and confine the underlying members.

31. In a blank separating machine, the combination of vertically movable pack supporting means, actuating means therefor, and a separator unit supported above the pack supporting means so as to be vertically movable, said separator unit comprising a rotatable separator roll adapted to contact with the uppermost blank of a pack supported on the pack supporting means, and means for rotating said separator roll.

32. A blank separating machine as specified in claim 31, in which a counter-balance is applied to said separator unit.

33. A blank separating unit as specified in claim 31, in which an adjustable counter-balance is applied to said separator unit.

In witness that I claim the foregoing as my invention, I affix my signature this 16th day of November, A. D. 1922.

WILLIAM WARD DAVIDSON.